US012639800B2

(12) United States Patent
Kopylov et al.

(10) Patent No.: US 12,639,800 B2
(45) Date of Patent: May 26, 2026

(54) DEFECT DETECTION FOR DENTAL APPLIANCES

(71) Applicant: Align Technology, Inc., San Jose, CA (US)

(72) Inventors: Eduard Kopylov, Moscow (RU); Elena Pogorelova, Zelenograd (RU); Evgeniy Kossov, Moscow (RU); Igor Olkhovskiy, Moscow (RU)

(73) Assignee: Align Technology, Inc., San Jose, CA (US)

( * ) Notice: Subject to any disclaimer, the term of this patent is extended or adjusted under 35 U.S.C. 154(b) by 279 days.

(21) Appl. No.: 18/210,608

(22) Filed: Jun. 15, 2023

(65) Prior Publication Data

US 2024/0005472 A1 Jan. 4, 2024

Related U.S. Application Data

(60) Provisional application No. 63/357,545, filed on Jun. 30, 2022.

(51) Int. Cl.
*G06T 7/00* (2017.01)
(52) U.S. Cl.
CPC .. *G06T 7/0004* (2013.01); *G06T 2207/20081* (2013.01); *G06T 2207/20084* (2013.01); *G06T 2207/30108* (2013.01)
(58) Field of Classification Search
CPC ......... G06T 7/0004; G06T 2207/20081; G06T 2207/20084; G06T 2207/30108; G06T 7/0012; G06T 2207/30036; B33Y 80/00; B33Y 10/00; G01N 21/9515; G06N 3/0442; G06N 3/0464; G06N 3/09; G06N 20/10; B29C 33/3842
See application file for complete search history.

(56) References Cited

U.S. PATENT DOCUMENTS

| | | | |
|---|---|---|---|
| 6,210,162 | B1 | 4/2001 | Chishti et al. |
| 6,309,215 | B1 | 10/2001 | Phan et al. |
| 6,450,807 | B1 | 9/2002 | Chishti et al. |
| 6,497,574 | B1 | 12/2002 | Miller |
| 6,830,450 | B2 | 12/2004 | Knopp et al. |
| 6,957,118 | B2 | 10/2005 | Kopelman et al. |
| 6,976,627 | B1 | 12/2005 | Culp et al. |
| 7,092,784 | B1 | 8/2006 | Simkins |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |

(Continued)

*Primary Examiner* — Jianxun Yang
(74) *Attorney, Agent, or Firm* — Lowenstein Sandler LLP

(57) ABSTRACT

A method of automated defect detection of a dental appliance comprises receiving a plurality of images of the dental appliance, and processing the plurality of images by a processing device to determine one or more defect estimations. The method comprises processing one or more sets of defect estimations to determine one or more defect classifications, wherein each set of the one or more sets comprises the one or more defect estimations associated with a subset of the plurality of images. The method comprises determining whether the dental appliance has a defect based on the one or more defect classifications associated with the one or more sets of defect estimations.

21 Claims, 20 Drawing Sheets

(56)                References Cited

U.S. PATENT DOCUMENTS

| | | |
|---|---|---|
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,943,386 B2 | 4/2018 | Webber et al. |
| 9,943,991 B2 | 4/2018 | Tanugula et al. |
| 10,336,102 B2 | 7/2019 | Cole |
| 10,495,973 B2 | 12/2019 | Cole |
| 10,783,629 B2 | 9/2020 | Parpara et al. |
| 10,888,395 B2 | 1/2021 | Kopelman |
| 11,055,910 B1 * | 7/2021 | Deng ................... G06V 20/647 |
| 11,189,021 B2 | 11/2021 | Shah et al. |
| 11,295,444 B2 | 4/2022 | Cherkas et al. |
| 11,420,362 B2 | 8/2022 | Mojdeh et al. |
| 11,511,485 B2 | 11/2022 | Mojdeh et al. |
| 11,534,277 B2 | 12/2022 | Chavez et al. |
| 11,602,413 B2 | 3/2023 | Chen et al. |
| 11,666,415 B2 | 6/2023 | Wang et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2020/0160497 A1 * | 5/2020 | Shah ......................... G06T 7/13 |
| 2020/0290262 A1 | 9/2020 | Aguilar Mendez et al. |
| 2021/0030516 A1 | 2/2021 | O'Leary et al. |

* cited by examiner

| Previous Viewpoint 1022 | | Current Viewpoint 1020 | | | | | | Next Viewpoint 1024 | |
| Maximum Confidence Detection 1028 | Auxiliary 1030 | Maximum Confidence Detection 1026 | | | | | Auxiliary Statistics 1027 | Maximum Confidence Detection 1032 | Auxiliary Statistics 1034 |
| Confidence Score | Detections Amount | Confidence Score | Squared Error Of X Position Relative To The Frame Center | Position Y | Size X | Size Y | Detections Amount | Confidence Score | Detections Amount |
|---|---|---|---|---|---|---|---|---|---|
| 0.0 | 0 | 0.26 | 0.02 | 0.14 | 0.05 | 0.08 | 1 | 0.0 | 0 |
| 0.0 | 0 | 0.1 | 0.07 | 0.57 | 0.05 | 0.08 | 1 | 0.0 | 0 |
| 0.1 | 1 | 0.12 | 0.05 | 0.59 | 0.05 | 0.08 | 1 | 0.0 | 0 |
| 0.0 | 0 | 0.11 | 0.17 | 0.38 | 0.06 | 0.07 | 1 | 0.0 | 0 |
| 0.14 | 1 | 0.49 | 0.09 | 0.6 | 0.06 | 0.07 | 1 | 0.0 | 0 |
| 0.32 | 4 | 0.8 | 0.11 | 0.64 | 0.06 | 0.07 | 6 | 0.26 | 1 |
| 0.15 | 1 | 0.54 | 0.00 | 0.22 | 0.06 | 0.07 | 1 | 0.36 | 3 |

*FIG. 10B*

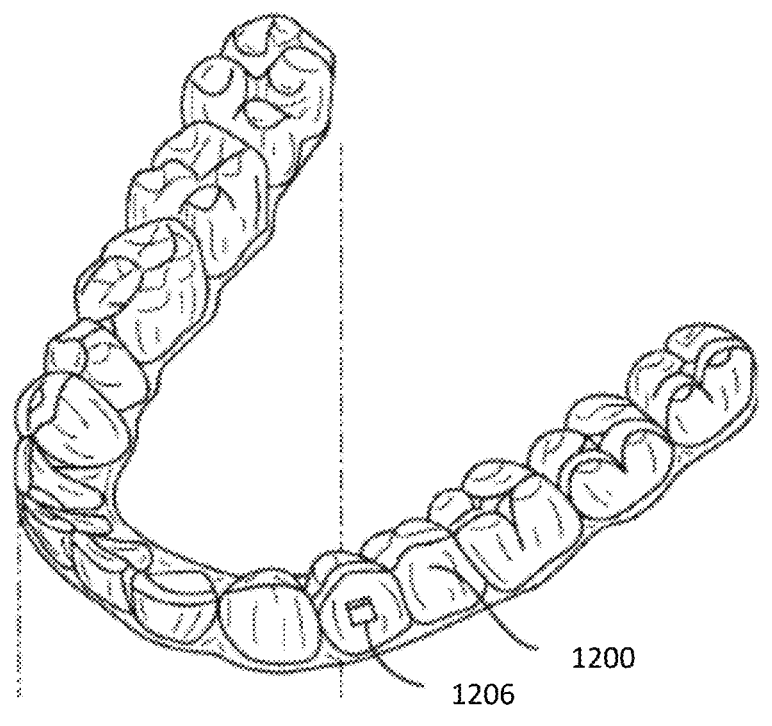
1200
1206
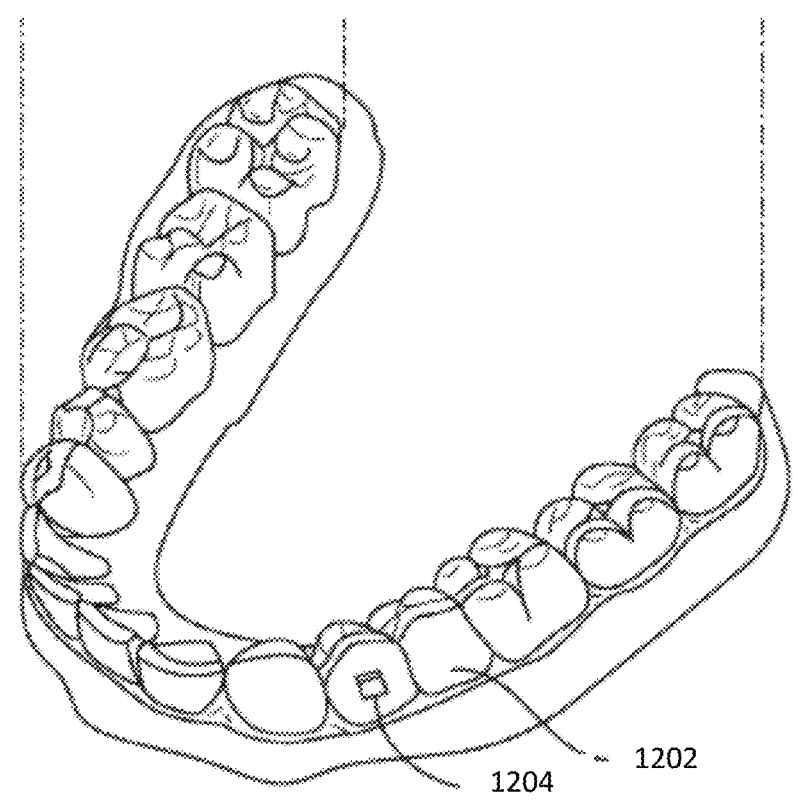
1202
1204
*FIG. 12A*

Figure 13:
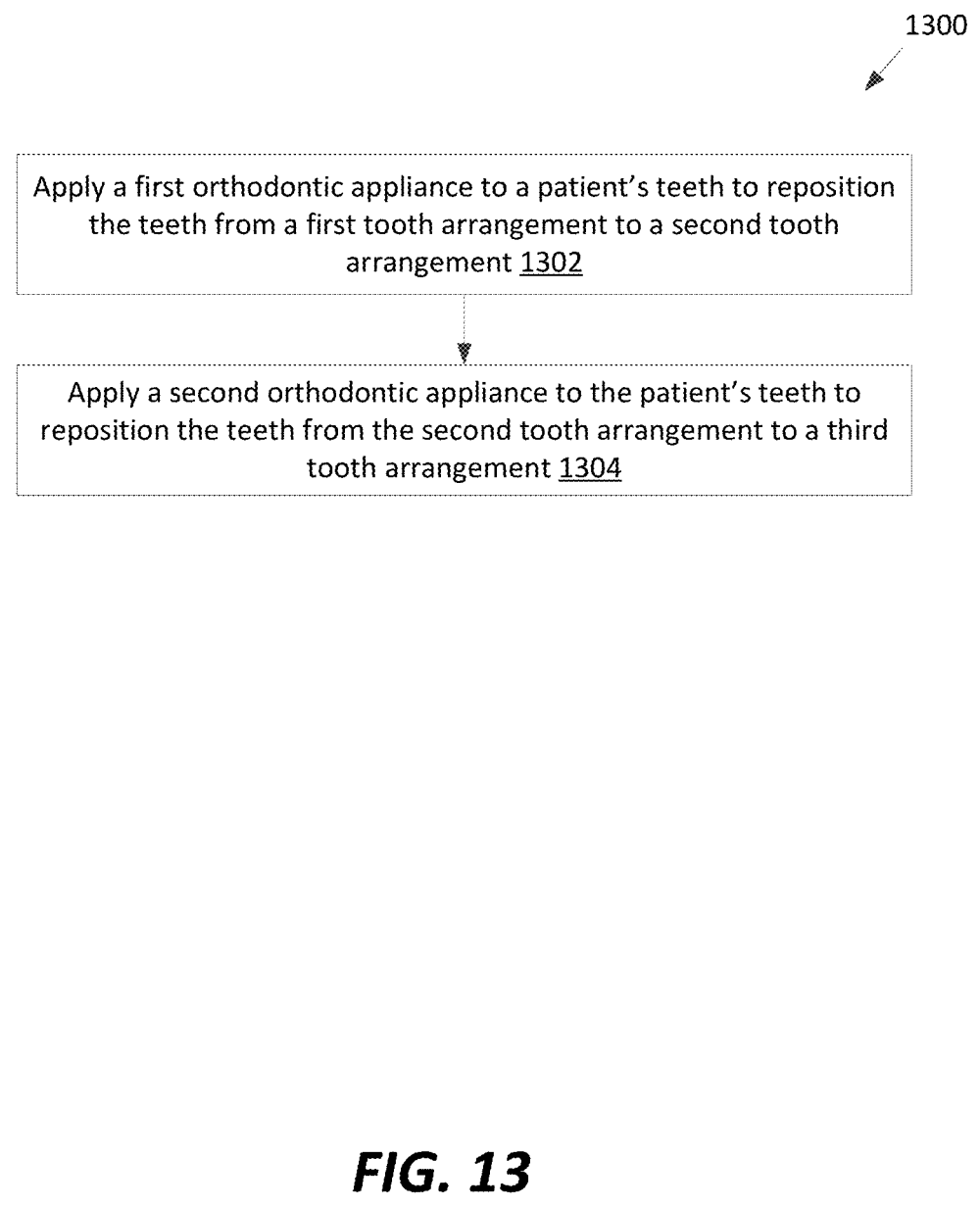

1300

Apply a first orthodontic appliance to a patient's teeth to reposition the teeth from a first tooth arrangement to a second tooth arrangement 1302

Apply a second orthodontic appliance to the patient's teeth to reposition the teeth from the second tooth arrangement to a third tooth arrangement 1304

Figure 14:
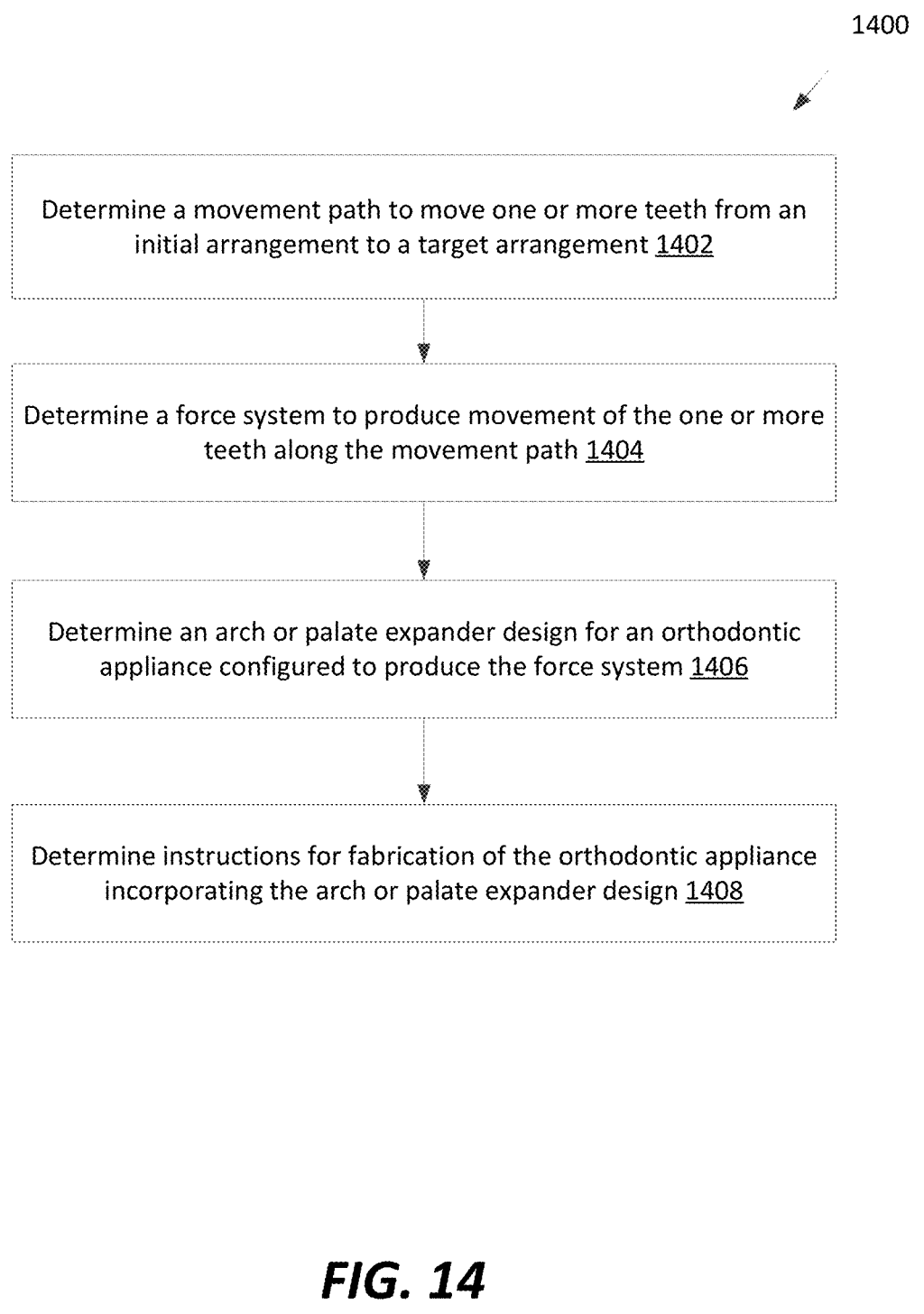

Determine a movement path to move one or more teeth from an initial arrangement to a target arrangement 1402

Determine a force system to produce movement of the one or more teeth along the movement path 1404

Determine an arch or palate expander design for an orthodontic appliance configured to produce the force system 1406

Determine instructions for fabrication of the orthodontic appliance incorporating the arch or palate expander design 1408

Receive a digital representation of a patient's teeth 1502

Generate one or more treatment stages based on the digital representation of the teeth 1504

Fabricate at least one orthodontic appliance based on the generated treatment stages 1506

DEFECT DETECTION FOR DENTAL APPLIANCES

RELATED APPLICATIONS

The present application claims the benefit under 35 U.S.C. § 119(e) of U.S. Provisional Patent Application No. 63/357,545, filed Jun. 30, 2022, which is incorporated by reference herein.

TECHNICAL FIELD

The present disclosure relates to the field of manufacturing custom products and, in particular, to detecting defects of custom dental appliances.

BACKGROUND

Three-dimensional (3D) printed molds may be used to form dental appliances such as orthodontic aligners. The 3D printed molds may be printed based on virtual 3D models generated for various treatment stages of orthodontic treatment, for example. Plastic sheets may be thermoformed over the 3D printed molds and then trimmed to form the dental appliances. Additionally, dental appliances may be directly printed using 3D printing techniques. In either instance, the dental appliances are subject to defects, which may include defects transferred from the 3D printed molds to the dental appliances as well as defects occurring on the dental appliances but not on 3D printed molds. Examples of defects include cracks, breaks, debris, indents, and so on.

Traditionally, inspection of dental appliances and defect detection are performed manually by technicians. However, such manual defect detection is time consuming, subjective, and error prone. Accordingly, manual defect detection produces a high number of both false positives (where defects are identified where there are no defects) and false negatives (where no defects are identified but there are defects).

SUMMARY

In a first implementation, a method of performing automated defect detection of a dental appliance comprises: receiving a plurality of images of the dental appliance; processing the plurality of images by a processing device using a first machine learning model trained to identify one or more types of defects, wherein for each image of the plurality of images the first machine learning model outputs one or more defect estimations; processing one or more sets of defect estimations using at least one of the first machine learning model or a second machine learning model, wherein each set of the one or more sets comprises the one or more defect estimations associated with a subset of the plurality of images, and wherein for each set the second model outputs one or more defect classifications; and determining whether the dental appliance has a defect based on the one or more defect classifications associated with the one or more sets of defect estimations.

A second implementation may extend the first implementation. In the second implementation, the method further comprises generating the plurality of images of the dental appliance using a camera, wherein each of the plurality of images is generated from a different point of view of the dental appliance.

A third implementation may extend the second implementation. In the third implementation, the plurality of images are generated while the dental appliance is rotated relative to the camera.

A fourth implementation may extend the second or third implementation. In the fourth implementation, the method further comprises: providing illumination of the dental appliance from a light source that is positioned on an opposite side of the dental appliance from the camera during generation of the plurality of images.

A fifth implementation may extend any of the first through fourth implementations. In the fifth implementation, the method further comprises: responsive to determining that the dental appliance has a defect, outputting a notice that the dental appliance is a defective orthodontic appliance.

A sixth implementation may extend any of the first through fifth implementations. In the sixth implementation, the plurality of images comprise a plurality of grayscale images.

A seventh implementation may extend any of the first through fifth implementations. In the seventh implementation, the first machine learning model comprises a convolutional neural network, and wherein the second machine learning model comprises a support vector machine.

An eighth implementation may extend any of the first through seventh implementations. In the eighth implementation, each defect estimation of the one or more defect estimations comprises at least one of a defect size, a defect mask, a defect location, or a confidence score for the defect estimation.

A ninth implementation may extend any of the first through eighth implementations. In the ninth implementation, each set of defect estimations comprises the one or more defect estimations associated with at least two neighboring images.

A tenth implementation may extend the ninth implementation. In the tenth implementation, the at least two neighboring images comprises at least three neighboring images.

An $11^{th}$ implementation may extend any of the first through tenth implementations. In the 11th implementation, the one or more types of manufacturing defects comprise at least one of a break in the aligner, debris on the aligner, or an indent in the aligner.

A $12^{th}$ implementation may extend any of the first through $11^{th}$ implementations. In the $12^{th}$ implementation, the method further comprises: generating, for a set of defect estimations associated with a subset of the plurality of images, a feature vector that comprises at least one of number of defects, defect coordinates, defect size, or defect confidence associated with each image of the subset of the plurality of images; wherein processing the one or more sets of defect estimations using the second machine learning model comprises, for each set of defect estimations, processing the feature vector generated for that set of defect estimations by the second machine learning model.

A $13^{th}$ implementation may extend the $12^{th}$ implementation. In the $13^{th}$ implementation, the method further comprises: for each image of the plurality of images, determining a distance between a nearest point on the dental appliance and a camera that generated the image, wherein the feature vector further comprises the determined distance for each image associated with the feature vector.

A $14^{th}$ implementation may extend any of the $12^{th}$ or $13^{th}$ implementations. In the $14^{th}$ implementation, the feature vector associated with the subset of the plurality of images comprises: defect coordinates, defect size, and first defect confidence for a first defect of a first image of the subset of images; a first number of defects, of a second image of the subset of images that is a neighboring image to the first image, and a second defect confidence for the first number of defects; and a second number of defects, of a third image of the subset of images that is a neighboring image to the first image, and a third defect confidence for the second number of defects.

A $15^{th}$ implementation may extend any of the first through $14^{th}$ implementations. In the 15th implementation, a computer readable storage medium comprises instructions that, when executed by a processing device, cause the processing device to execute the method of any of the first through $14^{th}$ implementations.

A $16^{th}$ implementation may extend any of the first through $14^{th}$ implementations. In the 16th implementation, a system comprises a memory and a processing device, wherein the processing device is to execute instructions from the memory to perform the method of any of the first through $14^{th}$ implementations.

In a $17^{th}$ implementation, a defect detection system of dental appliances comprises: a transparent rotatable platform to support a dental appliance; a camera to generate a plurality of images of the dental appliance at a plurality of rotation settings of the rotatable platform, wherein each image of the plurality of images depicts a distinct region of the dental appliance; and a light source disposed beneath the transparent rotatable platform, the light source to illuminate the dental appliance during generation of the plurality of images; and a computing device to: process the plurality of images using a first machine learning model, wherein for each image of the plurality of images the first machine learning model outputs one or more defect estimations; process one or more sets of defect estimations using a second machine learning model, wherein each set of the one or more sets comprises the one or more defect estimations associated with a subset of the plurality of images, and wherein for each set the second model outputs one or more defect classifications; and determine whether the dental appliance has a defect based on the one or more defect classifications associated with the one or more sets of defect estimations.

An $18^{th}$ implementation may extend the $17^{th}$ implementation. In the $18^{th}$ implementation, the computing device is further to: responsive to determining that the dental appliance has a defect, output a notice that the dental appliance is a defective orthodontic appliance.

A $19^{th}$ implementation may extend the $171^{h}$ or $18^{th}$ implementation. In the $19^{th}$ implementation, the first machine learning model comprises a convolutional neural network, and wherein the second machine learning model comprises a support vector machine.

A $20^{th}$ implementation may extend any of the $17^{th}$ through $19^{th}$ implementations. In the $20^{th}$ implementation, each defect estimation of the one or more defect estimations comprises at least one of a defect size, a defect location, or a confidence score for the defect estimation.

A $21^{st}$ implementation may extend any of the $17^{th}$ through $20^{th}$ implementations. In the $21^{st}$ implementation, each set of defect estimations comprises the one or more defect estimations associated with at least three neighboring images.

A $22^{nd}$ implementation may extend any of the $17^{th}$ through $21^{st}$ implementations. In the $22^{nd}$ implementation, the one or more defect classifications comprise at least one of a break in the aligner, debris on the aligner, or an indent in the aligner.

A $23^{rd}$ implementation may extend any of the $17^{th}$ through $22^{nd}$ implementations. In the $23^{rd}$ implementation, the computing device is further to: generate, for a set of defect estimations associated with a subset of the plurality of images, a feature vector that comprises at least one of number of defects, defect coordinates, defect size, or defect confidence associated with each image of the subset of the plurality of images; wherein processing the one or more sets of defect estimations using the second machine learning model comprises, for each set of defect estimations, processing the feature vector generated for that set of defect estimations by the second machine learning model.

A $24^{th}$ implementation may extend the $23^{rd}$ implementation. In the $24^{th}$ implementation, the computing device is further to: for each image of the plurality of images, determine a distance between a nearest point on the dental appliance and a camera that generated the image, wherein the feature vector further comprises the determined distance for each image associated with the feature vector.

A $25^{th}$ implementation may extend the $23^{rd}$ or $24^{th}$ implementation. In the $25^{th}$ implementation, the feature vector associated with the subset of the plurality of images comprises: defect coordinates, defect size, and first defect confidence for a first defect of a first image of the subset of images; a first number of defects, of a second image of the subset of images that is a neighboring image to the first image, and a second defect confidence for the first number of defects; and a second number of defects, of a third image of the subset of images that is a neighboring image to the first image, and a third defect confidence for the second number of defects.

In a $26^{th}$ implementation, a computer readable medium comprises instructions that, when executed by a processing device, cause the processing device to perform automated defect detection of a dental appliance based on operations comprising: receiving a plurality of images of the dental appliance; processing the plurality of images by a processing device using a first machine learning model trained to identify one or more types of defects, wherein for each image of the plurality of images the first machine learning model outputs one or more defect estimations; processing one or more sets of defect estimations using a second machine learning model, wherein each set of the one or more sets comprises the one or more defect estimations associated with a subset of the plurality of images, and wherein for each set the second model outputs one or more defect classifications; and determining whether the dental appliance has a defect based on the one or more defect classifications associated with the one or more sets of defect estimations.

In a $27^{th}$ implementation, a method of performing automated defect detection of a dental appliance comprises: generating a plurality of images of a dental appliance using a camera, wherein each of the plurality of images is generated from a different viewpoint of the dental appliance; processing the plurality of images by a processing device to determine, for each image of the plurality of images, one or more defect estimations; processing one or more sets of defect estimations to determine one or more defect classifications, wherein each set of the one or more sets comprises the one or more defect estimations associated with a subset of the plurality of images; and determining whether the dental appliance has a defect based on the one or more defect classifications associated with the one or more sets of defect estimations.

A $28^{th}$ implementation may further extend the $27^{th}$ implementation. In the $28^{th}$ implementation, processing of the plurality of images to determine, for each image of the plurality of images, the one or more defect estimations comprises processing the plurality of images using a first machine learning model trained to identify one or more types of defects, wherein for each image of the plurality of images the first machine learning model outputs the one or more defect estimations.

A $29^{th}$ implementation may further extend the $28^{th}$ implementation. In the $29^{th}$ implementation, processing the one or more sets of defect estimations comprises processing the one or more sets of defect estimations using at least one of the first machine learning model or a second machine learning model that outputs the one or more defect classifications.

A $30^{th}$ implementation may further extend the $28^{th}$ implementation or the $29^{th}$ implementation. In the $30^{th}$ implementation, the first machine learning model comprises a convolutional neural network and/or the second machine learning model comprises a support vector machine.

A $31^{st}$ implementation may further extend the $29^{th}$ implementation. In the $31^{st}$ implementation, the method further comprises: generating, for a set of defect estimations associated with a subset of the plurality of images, a feature vector that comprises at least one of number of defects, defect coordinates, defect size, or defect confidence associated with each image of the subset of the plurality of images; wherein processing the one or more sets of defect estimations using the second machine learning model comprises, for each set of defect estimations, processing the feature vector generated for that set of defect estimations by the second machine learning model.

A $32^{nd}$ implementation may further extend the $31^{st}$ implementation. In the $32^{nd}$ implementation, the method further comprises: for each image of the plurality of images, determining a distance between a nearest point on the dental appliance and a camera that generated the image, wherein the feature vector further comprises the determined distance for each image associated with the feature vector.

A $33^{rd}$ implementation may further extend the $31^{st}$ or $32^{nd}$ implementation. In the $33^{rd}$ implementation, the feature vector associated with the subset of the plurality of images comprises: defect coordinates, defect size, and first defect confidence for a first defect of a first image of the subset of images; a first number of defects, of a second image of the subset of images that is a neighboring image to the first image, and a second defect confidence for the first number of defects; and a second number of defects, of a third image of the subset of images that is a neighboring image to the first image, and a third defect confidence for the second number of defects.

A $34^{th}$ implementation may further extend any of the $28^{th}$ through $33^{rd}$ implementations. In the $34^{h}$ implementation, the plurality of images are generated from viewpoints evenly distributed about a point associated with the dental appliance.

A $35^{th}$ implementation may further extend the $34^{th}$ implementation. In the $35^{th}$ implementation, the point is a point on a platform that supports the dental appliance.

A $36^{th}$ implementation may further extend any of the $28^{th}$ through $35^{th}$ implementations. In the $36^{th}$ implementation, the plurality of images are generated from viewpoints that are at approximately 30 degree intervals of rotation about the dental appliance.

A $37^{th}$ implementation may further extend any of the $28^{th}$ through $36^{th}$ implementations. In the 37th implementation, the plurality of images are generated at a plurality of viewpoints (e.g., buccal viewpoints) that collectively are sufficient to capture a complete picture of defects on the dental appliance.

A $38^{th}$ implementation may further extend the $37^{th}$ implementation. In the $38^{th}$ implementation, the plurality of viewpoints capture interproximal regions of the dental appliance.

A $40^{th}$ implementation may further extend the $37^{th}$ or $38^{th}$ implementation. In the $40^{th}$ implementation, the plurality of viewpoints capture gingival regions of the dental appliance.

A $41^{st}$ implementation may further extend any of the $37^{th}$ through $40^{th}$ implementations. In the $41^{st}$ implementation, the plurality of viewpoints capture one or more areas of the dental appliance that are prone to damage from removal of the dental appliance from a mold or dentition.

A $42^{nd}$ implementation may further extend any of the $28^{th}$ through $41^{st}$ implementations. In the $42^{nd}$ implementation, the plurality of images are generated while the dental appliance is rotated relative to the camera.

A $43^{rd}$ implementation may further extend any of the $28^{th}$ through $42^{nd}$ implementations. In the $43^{rd}$ implementation, the method further comprises: providing illumination of the dental appliance from a light source that is positioned on an opposite side of the dental appliance from the camera during generation of the plurality of images.

A $44^{th}$ implementation may further extend any of the $28^{th}$ through $43^{rd}$ implementations. In the 44th implementation, the method further comprises: responsive to determining that the dental appliance has a defect, outputting a notice that the dental appliance is a defective orthodontic appliance.

A $45^{th}$ implementation may further extend any of the $28^{th}$ through $44^{th}$ implementations. In the 45th implementation, the plurality of images comprise a plurality of grayscale images.

A $46^{th}$ implementation may further extend any of the $28^{th}$ through $45^{th}$ implementations. In the 46th implementation, each defect estimation of the one or more defect estimations comprises at least one of a defect size, a defect location, a defect mask or a confidence score for the defect estimation.

A $47^{th}$ implementation may further extend any of the $28^{th}$ through $46^{th}$ implementations. In the 47th implementation, each set of defect estimations comprises the one or more defect estimations associated with at least two neighboring images.

A $48^{th}$ implementation may further extend the $47^{th}$ implementation. In the $48^{th}$ implementation, at least two neighboring images comprises at least three neighboring images.

A $50^{th}$ implementation may further extend any of the $28^{th}$ through $48^{th}$ implementations. In the 50th implementation, the one or more types of manufacturing defects comprise at least one of a break in the dental appliance, debris on the dental appliance, or an indent in the dental appliance.

A $51^{st}$ implementation may further extend any of the $28^{th}$ through $50^{th}$ implementations. In the $51^{st}$ implementation, a defect detection system may perform the method of any of the $28^{th}$ through $50^{th}$ implementations.

A $52^{nd}$ implementation may further extend the $51^{st}$ implementation. In the $52^{nd}$ implementation, the detect detection system comprises: a platform to support the dental appliance; a camera to generate the plurality of images of the dental appliance at a plurality of position settings about the platform; a light source to illuminate the dental appliance during generation of the plurality of images; and a computing device to perform the operations of any of the $28^{th}$ through $50^{th}$ implementations.

A $53^{rd}$ implementation may further extend the $52^{nd}$ implementation. In the $53^{rd}$ implementation, the platform is a rotatable platform, and the plurality of position settings comprise a plurality of rotation settings of the rotatable platform.

A $54^{th}$ implementation may further extend the $52^{nd}$ or $53^{rd}$ implementation. In the $54^{h}$ implementation, the platform is a transparent platform, and the light source is disposed beneath the transparent platform.

A $55^{th}$ implementation may further extend any of the $28^{th}$ through $50^{th}$ implementations. In the 55th implementation, a computer readable medium comprises instructions that, when executed by a processing device, cause the processing device to perform automated defect detection of a dental appliance according to the method of any of the 28th through 50th implementations.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 10B is a table of features used in feature vectors to be input into a defect classifier, in accordance with one embodiment.

FIG. 12A illustrates a tooth repositioning appliance, in accordance with embodiments.

FIG. 13 illustrates a method of orthodontic treatment using a plurality of appliances, in accordance with embodiments.

FIG. 14 illustrates a method for designing an orthodontic appliance to be produced by direct fabrication, in accordance with embodiments.

DETAILED DESCRIPTION OF THE DRAWINGS

Figure 1:
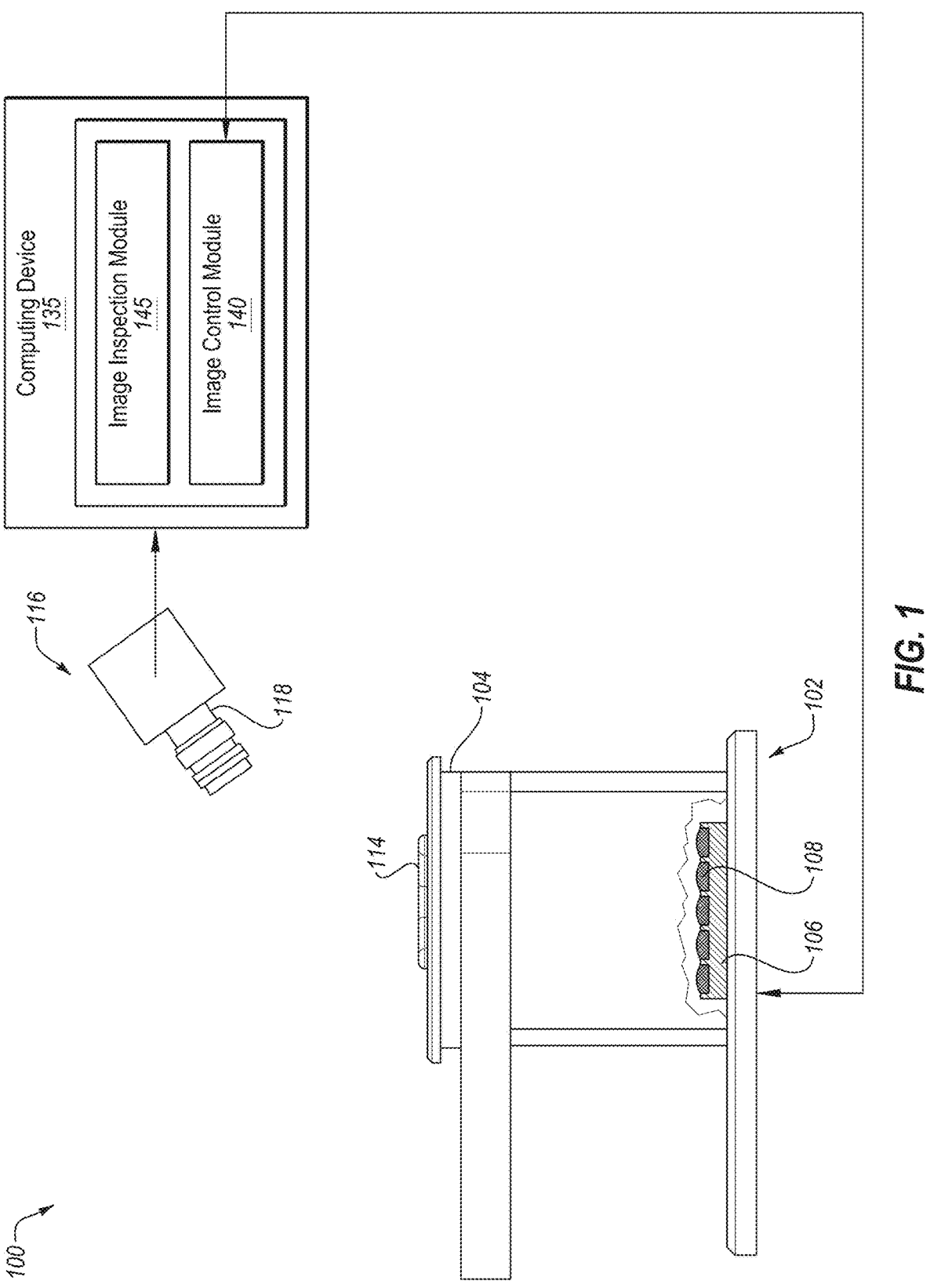
FIG. 1 illustrates one embodiment of an imaging defect detection system that performs automated defect detection of dental appliances, in accordance with one embodiment.

Described herein are embodiments covering systems, methods, and/or computer-readable media suitable for machine based defect detection of defects in dental appliances. The dental appliances may be, for example, orthodontic aligners (e.g., which may be polymeric aligners), sleep apnea devices, retainers, and so on. The dental appliances may be transparent or translucent in embodiments. The dental appliances may have been formed over molds via a thermoforming process or may have been directly printed using a 3D printer in embodiments.

In some embodiments, a mold for a dental appliance may be fabricated using additive manufacturing techniques (also referred to herein as "3D printing"). To manufacture the mold, a shape of the mold may be determined and designed using computer aided engineering (CAE) or computer aided design (CAD) programs. In some instances, stereolithography (SLA), also known as optical fabrication solid imaging, may be used to fabricate the 3D printed object. In SLA, the object is fabricated by successively printing thin layers of a photo-curable material (e.g., a polymeric resin) on top of one another. A platform rests in a bath of liquid photopolymer or resin just below a surface of the bath. A light source (e.g., an ultraviolet laser) traces a pattern over the platform, curing the photopolymer where the light source is directed, to form a first layer of the object. The platform is lowered incrementally, and the light source traces a new pattern over the platform to form another layer of the object at each increment. This process repeats until the object is completely fabricated. Once all of the layers of the object are formed, the object may be cleaned and cured.

In some embodiments, mold may be produced using other additive manufacturing techniques. Other additive manufacturing techniques may include: (1) material jetting, in which material is jetted onto a build platform using either a continuous or drop on demand (DOD) approach; (2) binder jetting, in which alternating layers of a build material (e.g., a powder-based material) and a binding material (e.g., a liquid binder) are deposited by a print head; (3) fused deposition modeling (FDM), in which material is drawn through a nozzle, heated, and deposited layer by layer; (4) powder bed infusion, including but not limited to direct metal laser sintering (DMLS), electron beam melting (EBM), selective heat sintering (SHS), selective laser melting (SLM), and selective laser sintering (SLS); (5) sheet lamination, including but not limited to laminated object manufacturing (LOM) and ultrasonic additive manufacturing (UAM); and (6) directed energy deposition, including but not limited to laser engineering net shaping, directed light fabrication, direct metal deposition, and 3D laser cladding.

In some embodiments, a 3D printed mold for a dental appliance such as an orthodontic aligner is manufactured. The mold may have the shape of a patient's dental arch and a dental appliance may be formed over the mold. To manufacture the mold, a shape of the dental arch for the patient at a treatment stage may be determined based on a custom treatment plan. In the example of orthodontics, the treatment plan may be generated based on an intraoral scan of a dental arch to be modeled. The intraoral scan may be performed to generate a 3D virtual model of the patient's dental arch. In some instances, SLA techniques may be used to fabricate the mold of the patient's dental arch in accordance with the description above.

Dental appliances may be formed from each mold of the patient's dental arch. In one embodiment, a sheet of material is pressure formed or thermoformed over the mold. To thermoform the aligner over the mold, the sheet of material may be heated to a temperature at which the sheet becomes pliable. Pressure may concurrently be applied to the sheet to form the now pliable sheet around the mold. In some embodiments, vacuum is applied to remove trapped air and pull the sheet onto the mold along with pressurized air to form the sheet to the detailed shape of the mold. Once the sheet cools, it will have a shape that conforms to the mold.

If the mold contains defects within its internal volume, on its surface, or on its interface, those defects may be transferred to the later formed aligner. For example, a gap may exist between one or more thin layers of the mold as a result of a malfunction of the mold manufacturing process, causing air to become trapped within that gap. When vacuum is applied to remove trapped air during aligner manufacture, the air trapped in the gap between the thin layers of the mold may be removed and the thin layers may be forced together, closing the gap when pressure is applied to the plastic sheet and causing an indent or divot in the dental appliance. Such internal volume defects may cause a deformation of the mold of the patient's dental arch during thermoforming of the aligner, which may be transferred to the aligner formed over the deformed mold in the form of dents, divots, etc. In another example, particles (e.g., debris), may form or collect on the surface of the mold. The shape of the particles may transfer to the dental appliance during the thermoforming process, causing protrusions in the dental appliance. In a further example, holes (e.g., pits) may form at the interface of the internal volume and the surface of the mold. The shape of the holes may transfer to the dental appliance during the thermoforming process, again causing indents or divots in the dental appliance. Defects such as indents, divots, protrusions, etc. may cause a dental appliance to not properly fit onto a patient's dentition, or may cause the dental appliance to be uncomfortable when worn.

After a dental appliance (e.g., orthodontic aligner) is thermoformed over a mold, the dental appliance may be trimmed along a gingival cut line. The dental appliance may be removed from the mold before or after trimming of the dental appliance. In order to remove the dental appliance from the mold, force is exerted on the dental appliance. Depending on the shape of the dental appliance and/or mold, the amount of force used to remove the dental appliance from the mold may cause the dental appliance to become damaged. For example, tears, cracks, rips, etc. may form in the dental appliance. Such damage to the dental appliance may reduce an effectiveness of the dental appliance for its intended purpose. For example, a torn orthodontic aligner may not apply required forces to a patient's teeth, and thus may not reposition the patient's teeth.

In other embodiments, a dental appliance may be manufactured via direct fabrication. Direct fabrication may include additive manufacturing techniques described above, or subtractive manufacturing techniques (e.g., milling). In some embodiments, direct fabrication involves forming a dental appliance (e.g., an orthodontic or polymeric aligner or a portion thereof) without using a physical template (e.g., mold, mask, etc.). In some embodiments, direct fabrication methods build up the object geometry in a layer-by-layer fashion, with successive layers being formed in discrete build steps. Alternatively or in combination, direct fabrication methods that allow for continuous buildup of an object geometry can be used. Other direct fabrication methods allowing for the buildup of object geometry in a layer-by-layer fashion may also be used.

Layering defects (e.g., internal voids, pits at a surface to interior volume interface, surface debris, layers with a thickness that deviates from a target layer thickness, delamination of layers, etc.) may form in a dental appliance formed by direct fabrication techniques. In some embodiments, a layering defect on the dental appliance may result in a patient using the aligner to experience discomfort, may cause the dental appliance to fail to impart planned forces on a patient's teeth, and/or may cause the dental appliance to fail to properly fit a patient's dental arch.

As mentioned above, some embodiments of the present disclosure may detect various defects in dental appliances. The defects may include material breakage, cracks, rips, debris, protrusions, indents, and so on. Detection of the defects may enable fixing the dental appliance or the mold used to fabricate the dental appliance to remove the defect, preventing the shipment of a deformed or subpar dental appliance, and/or remanufacture of the deformed or subpar dental appliance prior to shipment.

Some embodiments are discussed herein with reference to orthodontic aligners (also referred to simply as aligners or as polymeric aligners). However, embodiments also extend to other types of dental appliances, such as orthodontic retainers, orthodontic splints, sleep appliances for mouth insertion (e.g., for minimizing snoring, sleep apnea, etc.), and so on. Other applications of the present disclosure may be found when inspecting palatal expanders, removable mandibular repositioning devices, and removable surgical fixation devices.

Traditionally, dental appliances are inspected manually for quality control. Such manual inspection is highly subjective and frequently results in a high number of both false positive determinations of defects and false negative determinations of defects. Additionally, there is often little consistency between inspectors. As a result, dental appliances without significant defects are either thrown out or repurposed, and dental appliances with significant defects are overlooked. Embodiments provide an automated image-based quality control system, which includes a platform to hold a dental appliance, one or more cameras to generate images of the dental appliance, and an inspection logic to process the images and determine therefrom whether the dental appliance has any defects. The inspection logic may include multiple trained machine learning models, where a first machine learning model may operate on data from individual images, and a second machine learning model may operate on data from multiple images, where the data operated on by the second machine learning model may include an output of the first machine learning model. In some embodiments, the first and second machine learning models may be implemented as a single machine learning model that performs the operations of the above mentioned first and second machine learning models.

The automated image-based quality control system and techniques described in embodiments are more accurate and more uniform than traditional manual inspection of dental appliances. Accordingly, false positive determinations of defects and false negative determinations of defects may be reduced or eliminated in embodiments. Additionally, the consistency of quality in dental appliances may be increased.

Various software and/or hardware components may be used to implement the disclosed embodiments, as shown in FIGS. 1, 4A, 4B and 11. For example, software components may include computer instructions stored in a tangible, non-transitory computer-readable media that are executed by one or more processing devices to perform machine based defect detection of dental appliances, such as aligners. The software may setup and calibrate cameras included in the hardware components, capture images of dental appliances from various angles/viewpoints using the cameras, provide illumination to properly illuminate the dental appliance while images are captured, and/or perform automated analysis that identifies defects in dental appliances using one or more trained machine learning models.

Referring now to the figures, FIG. 1 illustrates one embodiment of a defect detection system 100 that performs automated defect detection of a dental appliance 114, in accordance with one embodiment. In one embodiment, the dental appliance 114 is an orthodontic aligner. In one embodiment, the dental appliance 114 is a shell that was formed over a 3D printed mold, and then optionally removed therefrom. In one embodiment, the dental appliance 114 is a 3D printed dental appliance. The defect detection system 100 may include an imaging system and a computing device 135. The imaging system may include a platform apparatus 102 and a camera apparatus 116. The platform apparatus 102 and camera apparatus 116 may be connected to computing device 135 via a wired or wireless connection. The computing device 135 may include an imager control module 140, which may send instructions to the platform apparatus 102 and/or camera apparatus 116 to cause the defect detection system 100 to capture images of one or more regions of a dental appliance 114 disposed on the platform apparatus 102. The captured images may be sent to the computing device 135, and an image inspection module 145 on the computing device 135 may analyze the images of the dental appliance 114 to determine whether any defects are present in the dental appliance 114.

The platform apparatus 102 may include a platform 104. The dental appliance 114 may sit on the platform 104 while images of the dental appliance 114 are captured and subsequently processed by a processing logic of the image inspection module 145. In some embodiments, the image inspection module 145 executes on a separate computing device from the image control module 140. For example, image inspection module 145 may execute on a remote device connected to computing device 135 by a wired or wireless network connection.

In one embodiment, the platform 104 is a rotational platform that may rotate about a vertical axis. In one embodiment, the platform 104 may be a multi-axis platform. In one embodiment, the multi-axis platform includes an x-y-z-θ control, allowing the platform 104 to move along 4 axes of motion. Alternatively, the multi-axis platform may include fewer degrees of control (e.g., a θ control that causes the multi-axis platform to rotate around a z-axis). The dental appliance 114 may be secured in a stationary position by a part holder (not shown) in some embodiments. Alternatively, the dental appliance 114 may rest on the platform 104 without use of a part holder. Imager control module 140 may send instructions to platform apparatus 102 to set a motion setting of the platform 104 (e.g., a rotation setting of the platform 104) and cause the platform 104 (and the dental appliance 114 disposed thereon) to move along or around at least one axis of motion (e.g., rotation and/or translational motion in the x, y, and/or z axes). In some embodiments, the platform 104 is rotated continuously while images are generated. Alternatively, the platform 104 may be rotated to a target orientation, and then rotation may be stopped while one or more images are generated.

The platform apparatus 102 may further include one or more light sources 106 disposed beneath the platform 104, which may include a first set of one or more light emitting elements 108. Each light emitting element 108 may include at least one of an incandescent light bulb, a fluorescent light bulb, a light-emitting diode (LED), a neon lamp, and so forth. In one embodiment, the one or more of the light emitting elements 108 may emit full spectrum light. In one embodiment, one or more of the light emitting elements 108 may emit light of a particular wavelength or spectrum. For example, light emitting elements 108 may emit red light, blue light, green light, infrared light, ultraviolet light, and so on. Light source 106 may include light emitting elements 108 that emit various different wavelengths or spectrums of light in embodiments. For example, some light emitting elements 108 may emit infrared light, while other light emitting elements may emit full spectrum light. In one embodiment, the platform 104 may be composed of a transparent material, allowing illumination from the light source 106 below the platform to pass through the platform 104 and provide illumination of a bottom of the dental appliance 114 from underneath the dental appliance 114.

In one embodiment the light source 106 may be a component of a smart lighting system. The smart lighting system may be controlled by imager control module 140, which may determine a target illumination for the dental appliance 114 and activate one or more light emitting elements 108 of the light source 106 to achieve the target illumination. Additionally, the smart lighting system may adjust an intensity of one or more of the light emitting elements. The light emitting elements 108 in the first light source 106 may be arranged in a pattern (e.g., as a grid of light emitting elements), and each light emitting element may provide illumination of the dental appliance 114 from a particular angle. Additionally, or alternatively, one or more of the light emitting elements 108 in the light source 106 may be moveable, and may be positioned to achieve light from a target angle. Alternatively, the light source 106 and camera 116 may have fixed relative positions. In embodiments, the imager control module 140 may determine a target illumination based on a size of the dental appliance 114, shapes of the dental appliance 114, a material that the dental appliance 114 is composed of, and so on. The target illumination may cause a target region of the dental appliance 114 that will be imaged to be illuminated, with minimal or no shadows occluding features of the dental appliance 114.

In some embodiments, dark-field illumination is used, where a black or otherwise dark background may be placed behind the dental appliance 114. Alternatively, bright-field illumination may be used, where the dental appliance 114 is placed between a camera and a bright light source.

The camera apparatus 116 may include one or more image sensor 118 that is configured to capture images of the dental appliance 114. The camera apparatus 116 may include a high definition camera in one embodiment. In some embodiments, the camera apparatus 116 may include one or more cameras that capture a wide field of view of the dental appliance 114. The camera apparatus 116 may be or include a two-dimensional camera or a 3D camera (e.g., a pair of cameras that generate a stereo image pair, a camera and associated structured light projector that shines a structured light pattern onto the dental appliance 114, and so on). The camera apparatus 116 may be configured to acquire images of the dental appliance 114 from multiple viewpoints. In one embodiment, the camera apparatus 116 has a fixed position. Alternatively, the camera apparatus 116 may be or include a movable camera. For example, the camera 116 may be moveable in the x, y and/or z directions and/or may rotate about one or more axes. Imager control module 140 may send instructions to camera apparatus 116 to set a zoom setting of the camera 116, to set an angle of the camera 116, to set a position of the camera 116, and so on. Instructions from the imager control module 140 may also cause the camera 116 to generate one or more images of the dental appliance 114.

In one embodiment, the platform 104 (and dental appliance 114 disposed thereon) may be stationary, and the camera apparatus 116 may be movable around the platform 104 (e.g., on a track that wholly or partially circumscribes the platform 104). In one embodiment, the platform 104 is a multi-axis platform or rotatable platform and the camera apparatus 116 is movable around the platform 104. In one embodiment, the camera apparatus 116 may capture multiple images and/or a video of the dental appliance 114 as it moves with the platform 104 and/or as the platform 104 rotates. The video may include multiple frames, where each frame may be an image of a distinct region of the dental appliance 114. In one embodiment, camera apparatus 116 captures 4-20 images (e.g., 12 images) of the dental appliance 114, each from a different rotation angle. Imager control module 140 may send instructions to camera apparatus 116 to set a zoom setting of the camera apparatus 116, to set an angle of the camera apparatus 116, to set a rotation angle of the platform 104, to set a position of the camera apparatus 116, and so on.

Image control module 140 may cause the camera apparatus 116 to capture images of the dental appliance 114. Image control module 140 may then receive the images and process the images according to the methods shown in FIGS. 4A-5.

In one embodiment, camera apparatus 116 generates a plurality of images of the dental appliance 114 from a plurality of different viewpoints. In some embodiments, the plurality of viewpoints are evenly distributed about a point associated with the dental appliance. The point may be, for example, a point on a support or platform for the dental appliance. The point may be a central point of the support for platform in an embodiment. In some embodiments, the images are generated from viewpoints that are at approximately 30 degree intervals of rotation about the dental appliance. The term approximately as applied to a given value may mean the given value+/−10%. In embodiments, the plurality of images are generated at a plurality of viewpoints that collectively are sufficient to capture a complete picture of defects on the dental appliance. In one embodiment, a plurality of viewpoints separated by 30 degree intervals of rotation about the dental appliance are sufficient to capture a complete picture of defects of the dental appliance (e.g., 12 viewpoints separated by 30 degree rotational intervals that together provide a 360 view of the dental appliance). In one embodiment, a plurality of viewpoints separated by 15 degree intervals of rotation about the dental appliance are sufficient to capture a complete picture of defects of the dental appliance (e.g., 24 viewpoints separated by 15 degree rotational intervals that together provide a 360 view of the dental appliance). In one embodiment, a plurality of viewpoints separated by 20 degree intervals of rotation about the dental appliance are sufficient to capture a complete picture of defects of the dental appliance (e.g., 16 viewpoints separated by 20 degree rotational intervals that together provide a 360 view of the dental appliance). In one embodiment, a plurality of viewpoints separated by 45 degree intervals of rotation about the dental appliance are sufficient to capture a complete picture of defects of the dental appliance (e.g., 8 viewpoints separated by 45 degree rotational intervals that together provide a 360 view of the dental appliance). Other amounts of images having different rotational or angular separation may also be sufficient to capture a complete picture of defects of the dental appliance. The plurality of viewpoints may capture, for example, interproximal regions of the dental appliance, gingival regions of the dental appliance, occlusal regions of the dental appliance, buccal regions of the dental appliance, lingual regions of the dental appliance, areas of the dental appliance that are prone to damage from removal of the dental appliance from a mold or dentition (e.g., which may correspond to interproximal regions of the dental appliance), and so on. Between each viewpoint, the platform 104 may rotate (or the position and/or orientation of the dental appliance 114 relative to the camera apparatus 116 may change). Light source 106 may generate illumination may be provided during generation of the images.

Figures 2A, 2B:
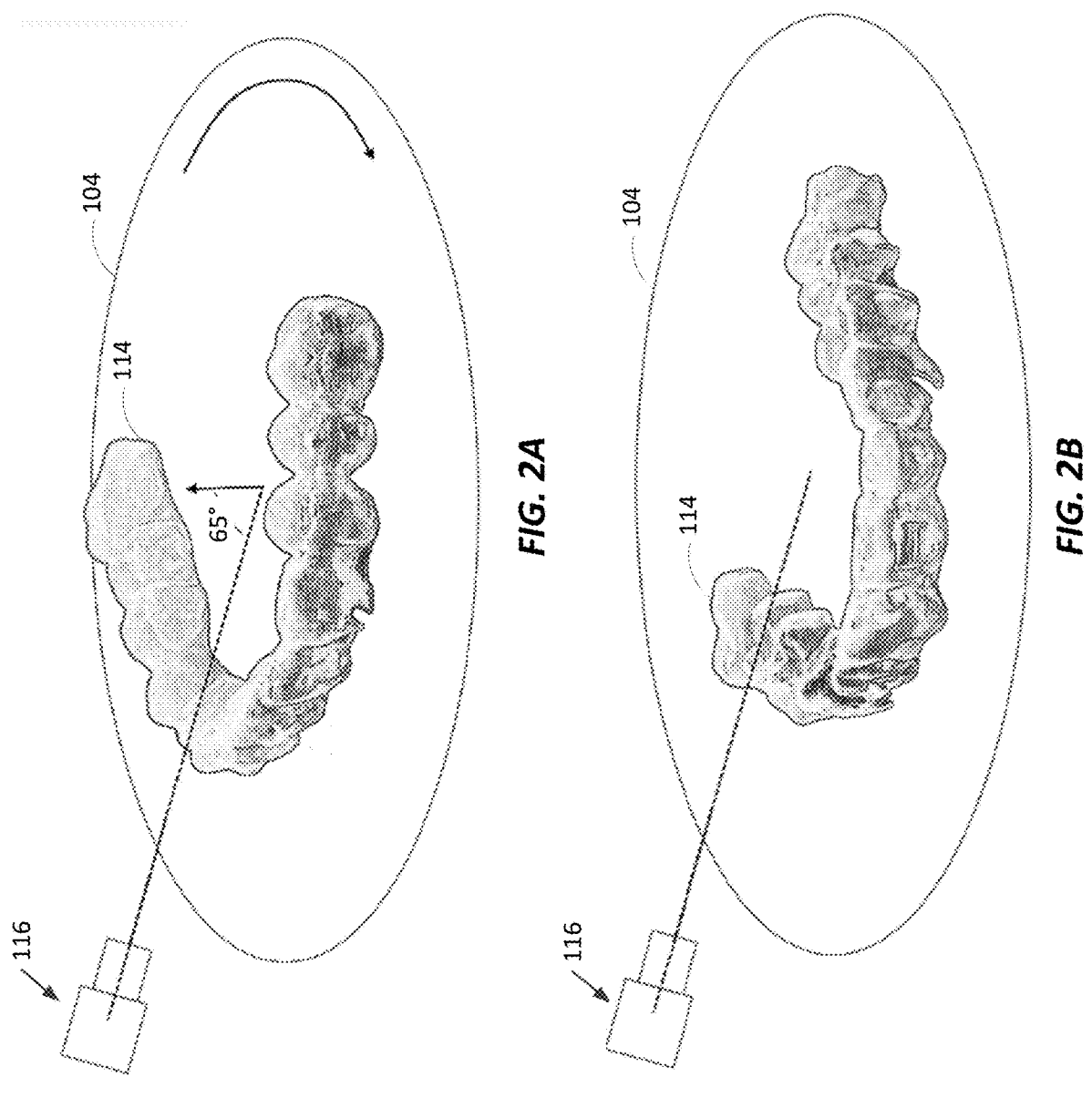
FIG. 2A illustrates a perspective view of an imaging defect detection system capturing an image of a first portion of a dental appliance, in accordance with one embodiment.
FIG. 2B illustrates a perspective view of an imaging defect detection system capturing an image of a second portion of a dental appliance, in accordance with one embodiment.

FIG. 2A illustrates a perspective view of an camera apparatus 116 capturing an image of a first portion of a dental appliance 114, in accordance with one embodiment. As shown, the dental appliance 114 is disposed on a platform 104, which may rotate to enable the camera apparatus 116 to generate images from multiple points of view of the dental appliance 114. The camera apparatus 116 may have a fixed angle relative to a vector normal to the platform 104. In the illustrated embodiment, the camera apparatus 116 has an angle of 65-70 degrees to the vector normal to the platform 104. In alternative embodiments, other angles may be used, which may vary between 90 degrees and 0 degrees to the vector normal to the platform 104. In some embodiments, camera apparatus 116 has a fixed position and angle, and all images are generated with a same angle relative to the vector normal to the platform 104. In other embodiments, an angle of the camera apparatus relative to the platform changes between at least some of the images.

FIG. 2B illustrates a perspective view of an imaging defect detection system capturing an image of a second portion of a dental appliance, in accordance with one embodiment. In FIG. 2B, the platform 104 and dental appliance 114 positioned thereon have rotated from the rotation setting shown in FIG. 2A.

Figure 3:
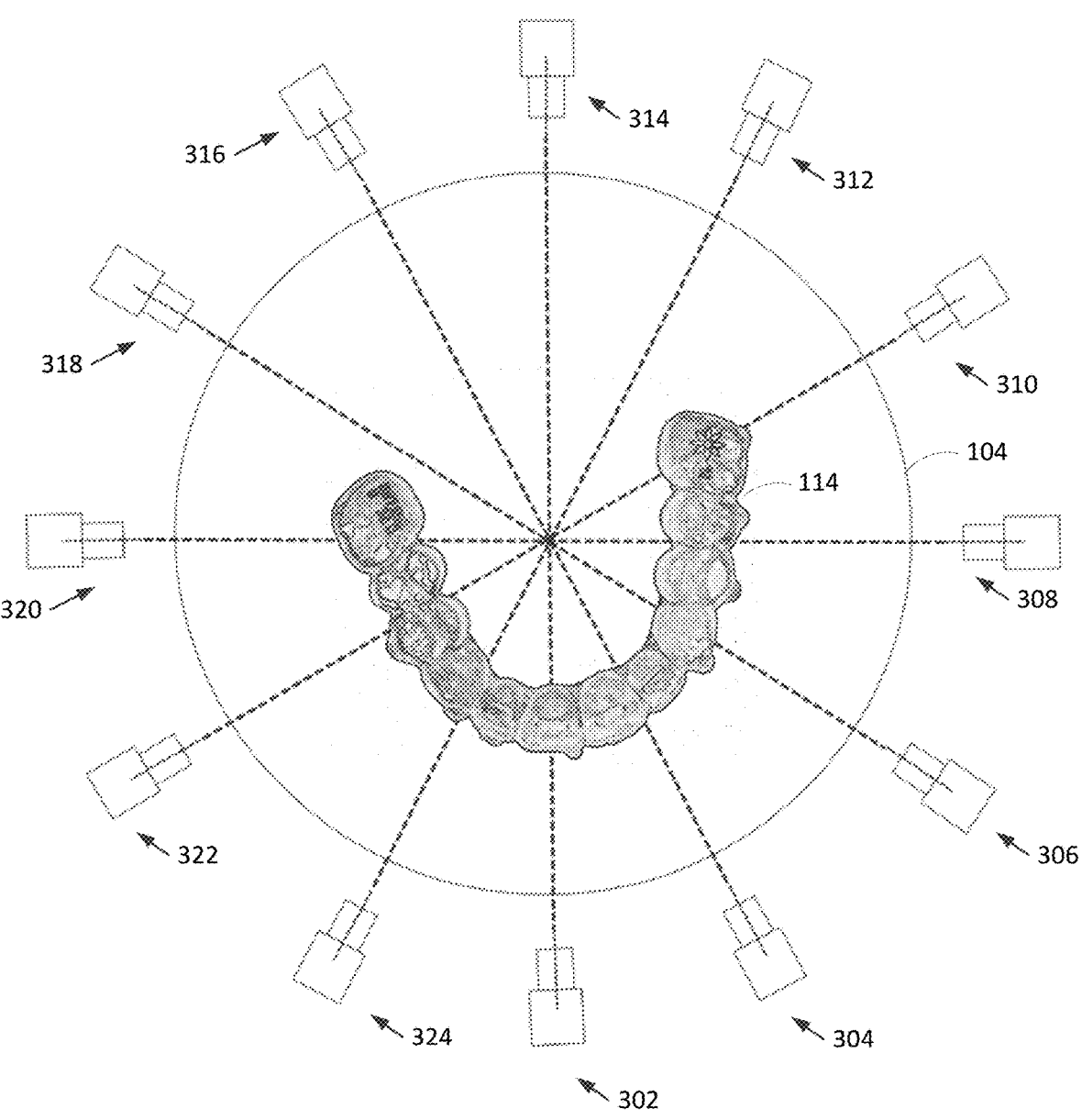
FIG. 3 illustrates a plurality viewpoints of a camera relative of an imaged dental appliance, in accordance with an embodiment.

FIG. 3 illustrates a plurality viewpoints of a camera apparatus relative of an imaged dental appliance 114, in accordance with an embodiment. In some embodiments, images are taken from viewpoints that are evenly distributed about the platform 104. In an example, 12 images may be generated from viewpoints 302-324 that are at 30 degree intervals. For example, viewpoint 302 may correspond to a platform rotation of 0 degrees, viewpoint 304 may correspond to a platform rotation of 30 degrees, viewpoint 306 may correspond to a platform rotation of 60 degrees, viewpoint 308 may correspond to a platform rotation of 90 degrees, viewpoint 310 may correspond to a platform rotation of 120 degrees, viewpoint 312 may correspond to a platform rotation of 150 degrees, and so on.

Returning to FIG. 1, in one embodiment the dental appliance includes a part identifier (ID), case ID, patient ID and/or other ID printed on or otherwise displayed thereon. One or more of the images that are generated of the dental appliance 114 may include an image of the ID. The image may be processed to determine the ID, and the dental appliance may be automatically identified therefrom.

In an example, the dental appliance 114 may include a laser marking that provides an identification of the dental appliance 114. The image control module 140 may perform optical character recognition (OCR) on a symbol sequence of the laser marking to determine the ID. In other embodiments, a technician may manually enter the ID associated with the dental appliance 114 at an inspection station using an interface, such as the user interface (UI). In other embodiments, the ID may be obtained based on a known order and/or position of the dental appliance in an object sorting system. For example, a robotic object sorting system may retrieve dental appliances and place them at a particular position in a staging area. A robotic arm may then retrieve the dental appliance from the staging area, and may determine the ID associated with the dental appliance based on the position of the dental appliance in the staging area. The determined ID may then be sent to the computing device 135.

The imager control module 140 may associate images of the dental appliance 114 with the determined ID. In one embodiment, the processing logic may determine a digital file associated with the ID. The digital file may include one or more properties associated with the dental appliance 114.

Once computing device 135 receives an image of the dental appliance 114, the image may be processed by image inspection module 145. In one embodiment, the imager inspection module 145 may comprise one or more trained machine learning module (e.g., an artificial neural network, deep neural network, support vector machine, etc.) that has been trained to estimate defects and/or classify defects. The trained machine learning model may have been trained using a training dataset, where each data item in the training dataset may include a) a 2D or 3D image, b) one or more defect labels, and possibly c) a camera angle/platform rotation setting. Each machine learning model may process data from an image, from a set of images and/or from an output generated by another machine learning model that processed data from the images. Each machine learning model may output an estimation/classification of one or more defects. In some embodiments, one or more machine learning model outputs information on a location of each detected defect (e.g., bounding box coordinates for a bounding box that bounds a defect), a size of each defect, and/or a confidence value for each defect. In some embodiments, for each point of pixel of an image, a machine learning model may output an indication of whether or not that pixel or point is associated with a defect. Each pixel or point may be associated with a confidence value and/or a confidence value may be associated with a set of proximate points or pixels that all share a defect class.

Figure 4A:
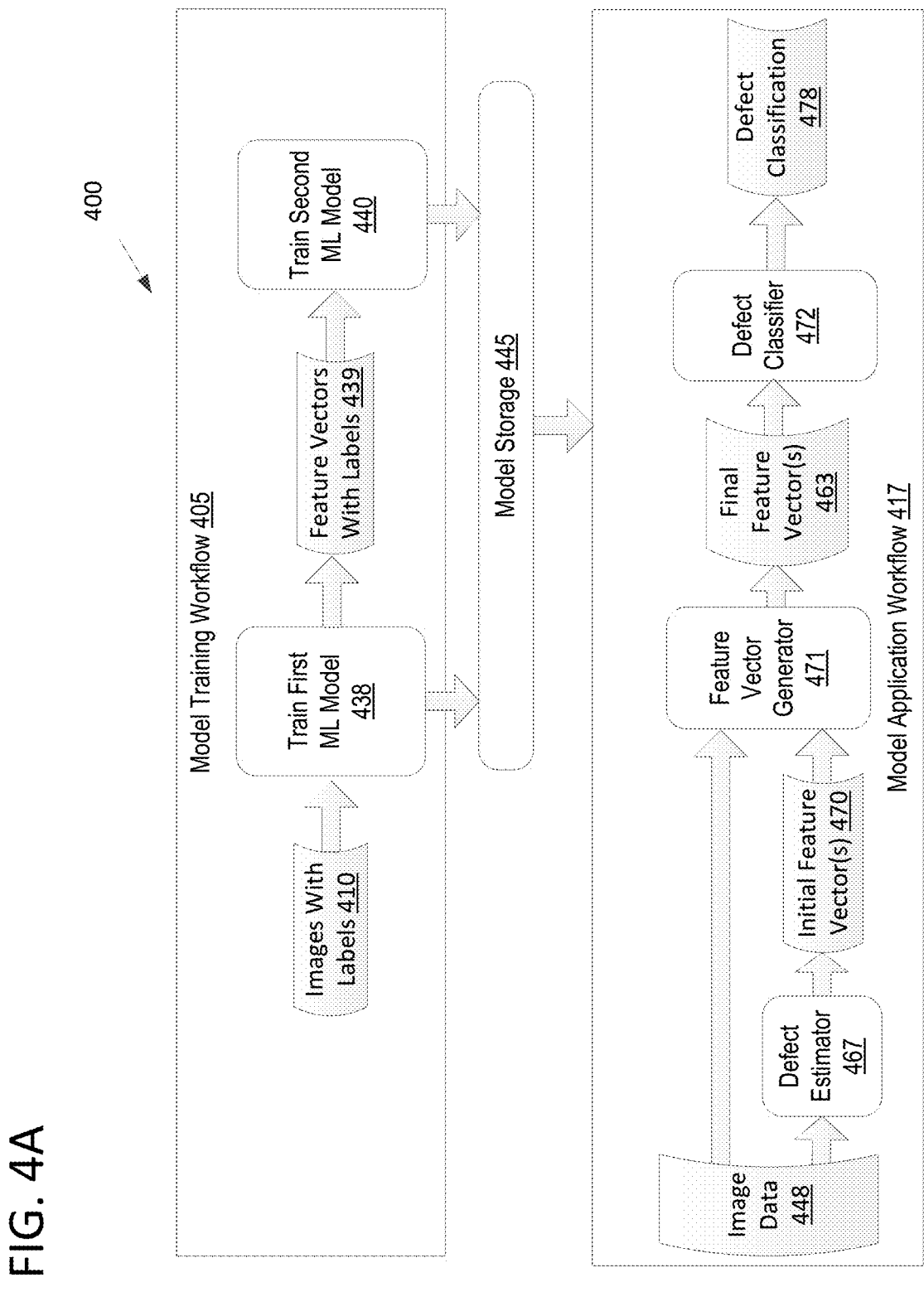
FIG. 4A illustrates a model training workflow and a model application workflow for an image inspection module, in accordance with an embodiment of the present disclosure.

FIG. 4A illustrates a model training workflow 405 and a model application workflow 417 for defect detection of dental appliances, in accordance with an embodiment of the present disclosure. In embodiments, the model training workflow 405 may be performed at a defect detection system or at a server separate from a defect detection system. If the model training workflow 405 is performed at a server, then the trained models may be provided to a defect detection system (e.g., to computing device 135 of FIG. 1), which may perform the model application workflow 417. The model training workflow 405 and the model application workflow 417 may be performed by processing logic executed by a processor of a computing device. One or more of these workflows 405, 417 may be implemented, for example, by one or more machine learning modules implemented in defect detection system or other software and/or firmware executing on a processing device of computing device 1100 shown in FIG. 11.

The model training workflow 405 is to train one or more machine learning models (e.g., deep learning models, support vector machines, convolutional neural networks, Gaussian models, random forest models, etc.) to perform one or more classifying, segmenting, detection, recognition, etc. tasks for images (e.g., 3D images, height maps, 2D color images, 2D near infrared (NIRI) images, 2D grayscale images, etc.) of dental appliances. The model application workflow 417 is to apply the one or more trained machine learning models to perform the classifying, segmenting, detection, recognition, etc. tasks for image data of images of dental appliances generated by a defect detection system.

One type of machine learning model that may be used to perform defect detection of dental appliances is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a residual neural network (ResNet) architecture is used for one or more machine learning model. ResNet is a gateless or open-gated variant of HighwayNet, which is a very deep feedforward neural network with hundreds of layers. The ResNet architecture uses skip connections or shortcuts to jump over some layers. ResNet models may be implemented with double- or triple-layer skips that contain nonlinearities and batch normalization in between. Models with several parallel skips are referred to as DenseNets. Skipping effectively simplifies the network, using fewer layers in the initial training stages. This speeds learning by reducing the impact of vanishing gradients, as there are fewer layers to propagate through. The network then gradually restores the skipped layers as it learns the feature space. Other example architectures that may be used include Mask R-CNN and Faster R-CNN.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future scans and make predictions based on this continuous scanning information. RNNs may be trained using a training dataset to generate a fixed number of outputs (e.g., to classify time varying data such as video data as belonging to a fixed number of classes). One type of RNN that may be used is a long short term memory (LSTM) neural network.

A common architecture for such tasks is LSTM (Long Short Term Memory). Unfortunately, LSTM is not well suited for images since it does not capture spatial information as well as convolutional networks do. For this purpose, one can utilize ConvLSTM—a variant of LSTM containing a convolution operation inside the LSTM cell. ConvLSTM is a variant of LSTM (Long Short-Term Memory) containing a convolution operation inside the LSTM cell. ConvLSTM replaces matrix multiplication with a convolution operation at each gate in the LSTM cell. By doing so, it captures underlying spatial features by convolution operations in multiple-dimensional data. The main difference between ConvLSTM and LSTM is the number of input dimensions. As LSTM input data is one-dimensional, it is not suitable for spatial sequence data such as video, satellite, radar image data set. ConvLSTM is designed for 3-D data as its input. In one embodiment, a CNN-LSTM machine learning model is used. A CNN-LSTM is an integration of a CNN (Convolutional layers) with an LSTM. First, the CNN part of the model processes the data and a one-dimensional result feeds an LSTM model.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

For the model training workflow 405, a first training dataset may contain hundreds, thousands, tens of thousands, hundreds of thousands or more labeled images 410 of dental appliances. The labeled images 410 may include pixel level or point level labeling of defects in embodiments. The labeled images 410 may be processed to generate one or multiple training datasets for training of one or more machine learning models. The machine learning model may be trained, for example, to automate defect detection processes for dental appliances. Such a trained machine learning model can be added to a defect detection system, and can be applied to significantly reduce a level of user input associated with defect detection.

Processing logic may gather a first training dataset 436 comprising 2D or 3D images of dental appliances having one or more associated labels (e.g., pixel-level labeled defect classes in the form of probability maps and/or bounding box coordinates/sizes), image level labels of defect classes, etc. One or more images and optionally associated probability maps in the training dataset 436 may be resized in embodiments. For example, a machine learning model may be usable for images having certain pixel size ranges, and one or more image may be resized if they fall outside of those pixel size ranges. The images may be resized, for example, using methods such as nearest-neighbor interpolation or box sampling. The training dataset may additionally or alternatively be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

To effectuate training of the first ML model 438 (e.g., defect estimator 467), processing logic inputs the training dataset of labeled images 410 into one or more untrained machine learning models. Prior to inputting a first input into a machine learning model, the machine learning model may be initialized. Processing logic trains the untrained machine learning model(s) based on the training dataset(s) to generate one or more trained machine learning models (e.g., defect estimator 467) that perform defect estimation.

Training may be performed by inputting one or more of the images into the machine learning model one at a time. Each input may include data from an image. The training data item may include, for example, a 2D image and an associated probability map or bounding box coordinates and/or size, which may be input into the machine learning model. As discussed above, training data items may include color images, grayscale images, images generated under specific lighting conditions (e.g., UV or IR radiation), and so on. In some embodiments, pixels of images may include height values or may include both height values and intensity values. The data that is input into the machine learning model may include a single layer (e.g., just luminosity values) or multiple layers.

The first machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to perform defect classification, there may be a first class (defect), and a second class (no defect). Moreover, the class, prediction, etc. may be determined for each pixel in the image, or may be determined for each region or group of pixels of the image. For pixel level segmentation, for each pixel in the image, the final layer applies a probability that the pixel of the image belongs to the first class, a probability that the pixel belongs to the second class, and so on.

Accordingly, the output may include one or more prediction and/or one or more a probability map and/or one or more bounding box coordinates and/or sizes for bounding boxes that bound defects. For example, an output probability map (e.g., which may be a defect mask) may comprise, for each pixel in an input image, a first probability that the pixel belongs to a first defect class, a second probability that the pixel belongs to a second defect class, and so on. In another example, an output bounding box may include a lower left or upper left coordinate of a bounding box and a size (e.g., x size and y size) of the bounding box.

Processing logic may then compare the generated probability map, bounding box coordinates and/or size and/or other output to the known probability map, bounding box coordinates and/or size and/or other label that was included in the training data item. Processing logic determines an error (i.e., a classification error) based on the differences between the output probability map and/or bounding box coordinates/size and the provided probability map and/or bounding box coordinates/size. Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

Once the defect estimator 467 has been trained, the labeled images or a different set of labeled images may be processed by the trained defect estimator 467. The labeled images may include many sets of labeled images, where each set of labeled images includes multiple images of a same dental appliance, but from different viewpoints. The labeled images may be labeled with a viewpoint of the image (e.g., a platform rotation setting for the image) as well as pixel-level defect labels and/or bounding box coordinates and/or sizes. In some embodiments, the pixel-level defect labels include a label of a bounding box around a defect. This may include, for example, an upper left and lower right coordinate of a bounding box, an upper right and lower left coordinate of a bounding box, or a coordinate of a corner of the bounding box and a size of the bounding box. For each image, the defect estimator may output defect predictions (e.g., pixel level or group level predictions). This may include outputting a probability map that includes, for each pixel, a probability of the pixel being a defect and a probability of the pixel not being a defect. This may additionally or alternatively include a prediction of a bounding box location and/or size, where the bounding box bounds a defect.

Groups of two, three or more neighboring images of dental appliances may be generated. For each group, each of the images of the group may be processed by defect estimator 467 to generate outputs. The outputs of each of the images of the group may then be combined to form a feature vector for the group. The feature vector may include some information output by the defect estimator 467 for each of the images in the group.

FIG. 10B shows one example of data included in each feature vector in one embodiment. For each image, multiple defects may be detected, and each defect may be associated with a different bounding box (or other bounding area). An image group may include a current viewpoint image 1020, a previous viewpoint image 1022 and a next viewpoint image 1024. For a current viewpoint 1020, data for a detected defect having a maximum confidence score 1026 may be included in the feature vector. For that maximal defect 1026, a confidence score, a squared error of an x-position of the bounding box relative to a frame center, a y position of the defect, an x size of the defect, and a y size of the defect may be included in the feature vector. For the current viewpoint 1020, auxiliary statistics 1027 may also be included in the feature vector, where the auxiliary statistics 1027 may include a number of defects detected in the image. For the previous viewpoint 1022, a confidence score of a detected defect having a maximal confidence score 1028 for that image is included in the feature vector, as well as auxiliary statistics 1030 including a number of detected defects for that image. Similarly, for a next viewpoint 1024, a confidence score of a detected defect having a maximal confidence score 1032 for that image is included in the feature vector, as well as auxiliary statistics 1034 including a number of detected defects for that image. The feature vector may additionally include labels of viewpoints (e.g., platform rotation angles) for each image in the image group used for the feature vector as well as labels of whether and where defects are present for the dental appliance in the images.

In one embodiment, the feature vector includes a y-position of the max-confidence defect detection, which indirectly estimates how close the detection position (of the defect) is to a camera. The higher the y-coordinate, the closer the imaged object is to the camera. In one embodiment, the feature vector includes a squared error of the x-coordinate. The squared error of the x-coordinate esti-mates how far the dental appliance is located from a center of the platform on which it was placed during imaging. The squared error of the x-coordinate indicates whether the camera views a surface of the dental appliance tangentially (imaging axis of the camera is parallel to a vector normal to the surface). The probability of correct classification may be higher when the camera a) views an object normally (a tangent of a surface of the object is normal to an imaging axis or rays of the camera and b) closely (the imaged surface of the dental appliance is close to the camera, as represented by a high y-coordinate).

In one embodiment, the feature vector includes a defect size value in the x and y axes. It has been observed that for defect sizes that are greater than a size threshold, the chance of a false positive (where a non-defect is identified as a defect) goes up. Accordingly, defect size may be useful information for determining whether a detected defect is a true defect.

The table of FIG. 10B provides example feature vectors for four image groups. The image groups associated with the first four rows of the column are images of a defect free dental appliance. Accordingly, when the feature vectors of these image groups are processed by the defect classifier, the defect classifier outputs a result of "no defect". The image groups associated with the last three rows of the column are images of a defective dental appliance. Accordingly, when the feature vectors of these image groups are processed by the defect classifier, the defect classifier outputs a result of "defect".

Returning to FIG. 4A, a second machine learning model may be trained at block 440 using the training dataset. During training, the machine learning model may generate an output indicating whether a defect is predicted, and the output may be compared to a label indicating whether a defect was actually present. If the output is incorrect, then the second machine learning model may be updated accord-ingly. In one embodiment, the second machine learning model is a support vector machine (SVM). In machine learning, SVMs are supervised learning models with asso-ciated learning algorithms that analyze data for classification and regression analysis. Given a set of training examples, each marked as belonging to one of two categories (e.g., defect and no defect), an SVM training algorithm builds a model that assigns new examples to one category or the other, making it a non-probabilistic binary linear classifier. SVM maps training examples to points in space so as to maximize the width of the gap between the two categories. New examples are then mapped into that same space and predicted to belong to a category based on which side of the gap they fall. SVMs can also perform non-linear classifica-tion in embodiments. In one embodiment, the SVM includes a radial basis function (RBF) kernel. Other kernels may also be used. Ultimately, the second ML model may be used for defect classifier 472. In embodiments, machine learning models other than SVMs may be used for the defect clas-sifier 472. For example, the defect classifier 472 may be a trained convolutional neural network or deep neural net-work.

Once the defect estimator 467 and defect classifier 472 are generated, they may be stored in model storage 445, and may be added to a defect detection system. The defect detection system may then use the one or more trained ML models (i.e., defect estimator 467 and defect classifier 472) as well as additional processing logic to implement auto-mated defect detection of dental appliances.

In one embodiment, model application workflow 417 includes one or more trained machine learning models that function as a defect estimator 467 and a defect classifier 472. For model application workflow 417, according to one embodiment, a camera of a defect detection system gener-ates image data 448, which includes images of a dental appliance generated from different viewpoints (e.g., differ-ent rotation settings of a platform).

Image data 448 may be input into defect estimator 467, which may include a trained neural network. Based on the image data 448, defect estimator 467 outputs initial feature vectors 470, which may be defect predictions that can include defect location and/or size (e.g., in the form of coordinates of a bounding box or other bounding shape around a defect) for each predicted defect and a defect confidence score for each predicted defect. Feature vector generator 471 may generate image groups (e.g., groups of 2, 3 or more neighboring images), and may use information from the initial feature vectors for each image in an image group to generate a final feature vector for the image group. The final feature vector 463 may additionally include infor-mation from image data 448, such as viewpoint information for the images in the image group. A final feature vector 463 may be generated for each image group.

Each image group may be input into defect classifier 472. Defect classifier 472 may then output a defect classification 478 for the image group. The defect classification output by the defect classifier 472 has a much higher level of accuracy than the defect predictions output by defect estimator 467 because it takes into account data from multiple images taken from different viewpoints.

In one embodiment, a single machine learning model is trained and used for model application workflow 417, where the single machine learning model is a convolutional neural network that takes as input a set of multiple neighboring images. The machine learning model may output defect predictions for each of the images in the set of input images based on information from each of the images in the set. The single machine learning model may be used instead of defect estimator 467 and defect classifier 472 in embodiments.

In some embodiments, multiple defect estimators 467 and/or defect classifiers 472 are trained. Each defect esti-mator 467 and defect classifier 472 may be trained to detect a particular type or class of defect. For example, a first defect estimator 467 and/or first defect classifier 472 may be trained to defect a broken, ripped or torn aligner and a second defect estimator 467 and/or second defect classifier 472 may be trained to detect debris defects, and/or a third defect estimator 467 and/or third defect classifier 472 may be trained to detect indent defects.

Once the defect estimator 467 and defect classifier 472 are trained, their accuracy may be tested using one or more techniques. Two such techniques that may be used to test accuracy are determining a false positive rate (FPR) metric and precision and recall metric, which may be used to determine a mean average precision metric for one or both of the defect estimator 467 and defect classifier 472.

Figure 4B:
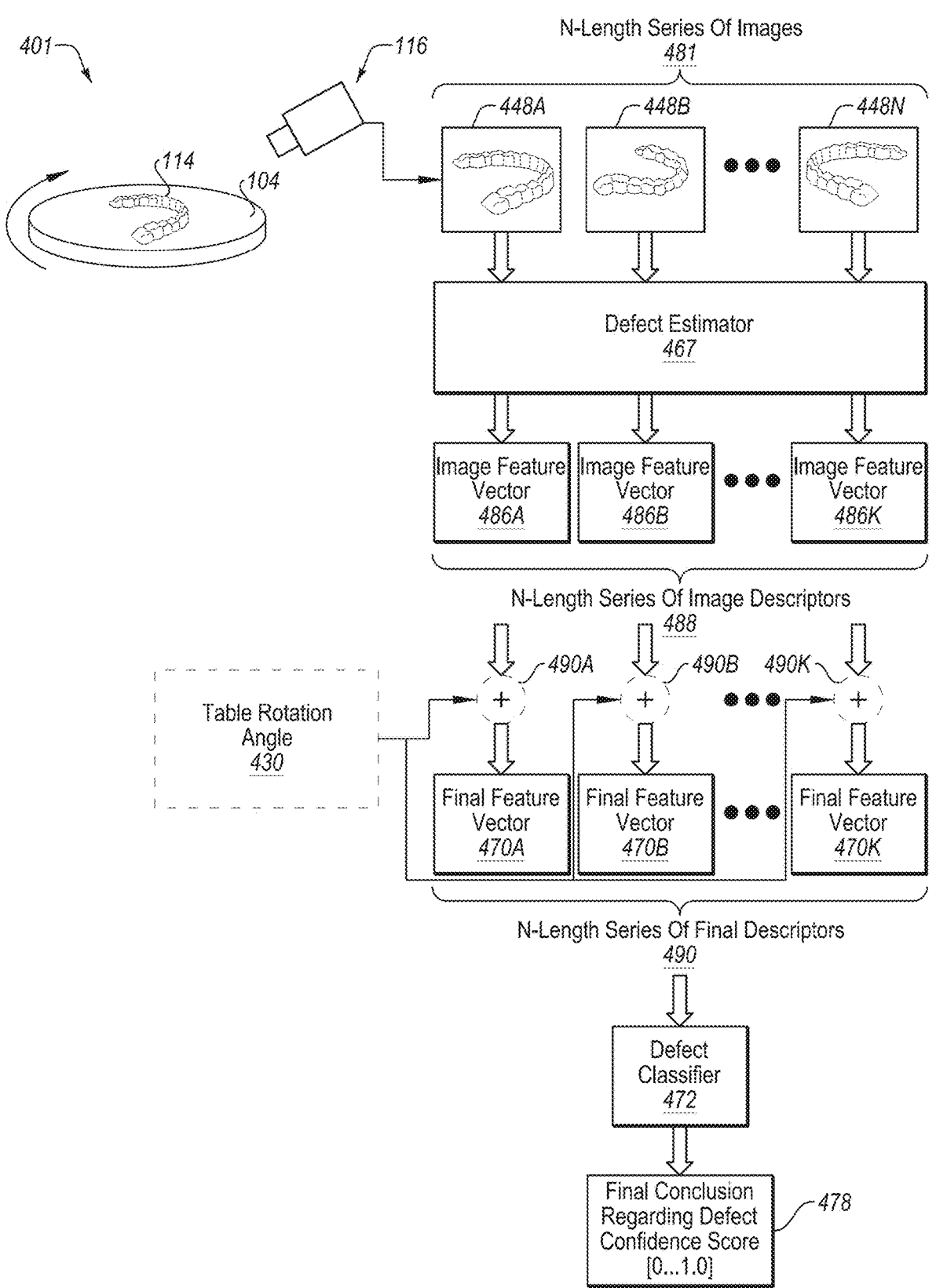
FIG. 4B illustrates a dataflow of a defect estimator and a defect classifier regarding defect detection, in accordance with an embodiment of the present disclosure.

FIG. 4B illustrates a dataflow 401 of a defect estimator 467 and a defect classifier 472 regarding defect detection, in accordance with an embodiment of the present disclosure. The dataflow 401 may correspond to the model application workflow of FIG. 4A in embodiments. The dataflow 401 may include generating an n-length series of images 481 of a dental appliance 114 on a platform 104 using a camera apparatus 116 (also referred to as an image capture device). The n-length series of images 481 may include images 448A, 448B, through 448N. In embodiments, n may be an integer value from 4 to 30. N may also have any other value, such as 12, 50, 100, 1000, and so on.

Either as images 448A-N are generated, or after the entire n-length series of images 481 has been generated, some or all of the images 448A-N are processed by defect estimator 467. In some instances, a quality check may be performed on images 448A-N before the images are processed using defect estimator 467. The quality check may be performed to determine whether a received image is processable. In one embodiment, processing logic determines whether a contrast depicted in an image is sufficient to enable further image processing operations (e.g., edge detection, processing by a trained machine learning model, etc.) to be performed. In one embodiment, processing logic determines a contrast metric for the image, and determines whether the contrast metric exceeds a contrast threshold. If the contrast metric is below the contrast threshold, the processing logic may determine the image is not processable, and thus fails to pass the quality check. If the contrast metric exceeds the contrast threshold, processing logic may determine that the image is processable, and passes the quality check.

Fewer than all of the images 448A-N may be processed, for example, if some of the images 448A-N are determined to fail the quality check. In such an instance, the defect estimator 467 may process K images, where K is an integer value that is less than N. In some instances, preprocessing may be performed on the images before they are input into the defect estimator 467. Such preprocessing may include, for example, cropping, padding, image processing, and so on. For each image, defect estimator 467 may output a defect estimation, optionally in the form of an image feature vector 486A-K and/or a defect mask. Each image feature vector 486A-K may be associated with a respective image 448A-N, and may include estimates for one or more defects in the respective image 448A-N. A defect mask may be a mask that includes, for each pixel of one or more of the images 338A-N, an indication as to whether or not that pixel is associated with a defect. For example, pixels in the mask having a value of 1 may be associated with a defect and pixels in the mask having a value of 0 may be associated with defect-free areas. In one embodiment, a single defect mask is generated for an image. In one embodiment, a single image may be associated with multiple defect masks, where each defect mask may be for a different defect in the image. Defect estimates may be in the form of probability maps in one embodiment, where each pixel includes a probability of being a defect and a probability of not being a defect. In one embodiment, a defect map includes a probability value for each pixel of one or more of the images 338A-N. Clusters of neighboring pixels that have a high probability of being a defect may be grouped into a single defect in some embodiments. In one embodiment, defect estimates are in the form of bounding boxes or bounding shapes. For each estimated defect, the output of the defect estimator 467 may include one or more bounding box/shape coordinates and/or a bounding box/shape size. For each defect estimate, the output (e.g., image feature vector 486A-K) may include a confidence score indicating a confidence that the defect estimation is correct. The result of processing the images from the n-length series of images 481 may be a k-length series of image descriptors 488, where each of the image descriptors includes an image feature vector 486A-K. In some embodiments, K is equal to N. Alternatively, K may be larger or smaller than N.

At a next operation in the dataflow 401, respective table rotation angle 430 data for each image is added to the appropriate image feature vector 486A-K associated with that image (e.g., at operations 490A-K). Image feature vectors may then be grouped into a k-length series of final descriptors 490 that includes final feature vectors 470A-K. Each final feature vector may include data from an image feature vector 486A-K for a set or group of multiple neighboring images (i.e., images taken from nearby viewpoints). A determination of which images are neighbor images may be made based on the table rotation angle 430 associated with each of the image feature vectors 486A-K. Each final feature vector 470A-K may include data for a current image as well as data for a previous (in space) image and data for a next (in space) image. With reference to FIG. 3, an image descriptor for which an image taken from viewpoint 302 is the current image may include data from image feature vectors for the image taken from viewpoint 302, for the image taken from viewpoint 324, and for the image taken from viewpoint 304. In another example, an image descriptor for which an image taken from viewpoint 304 is the current image may include data from image feature vectors for the image taken from viewpoint 304, for the image taken from viewpoint 302, and for the image taken from viewpoint 306. The contents of each final feature vector may include the data specified in the table of FIG. 10B in one embodiment.

Returning to FIG. 4B, each final feature vector 470A-K of the k-length series of final descriptors 490 may be input into defect classifier 472. Defect classifier may then output, for each final feature vector 470A-K, whether a defect was classified for the final feature vector 470A-K. This is represented as a final conclusion regarding a defect confidence score 478 in the dataflow 401. The final conclusion may be a defect confidence score, which may have a value between 0 (no confidence of a defect) to 1 (100% confidence of a defect). In embodiments, the confidence score may be compared to a threshold. If the confidence score meets or exceeds the threshold, then a defect is detected. If the confidence score is below the threshold, then no defect is detected. Accuracy of the dataflow 401 for identifying defects is very high, with close to zero false positives or false negatives in embodiments.

Figure 5:
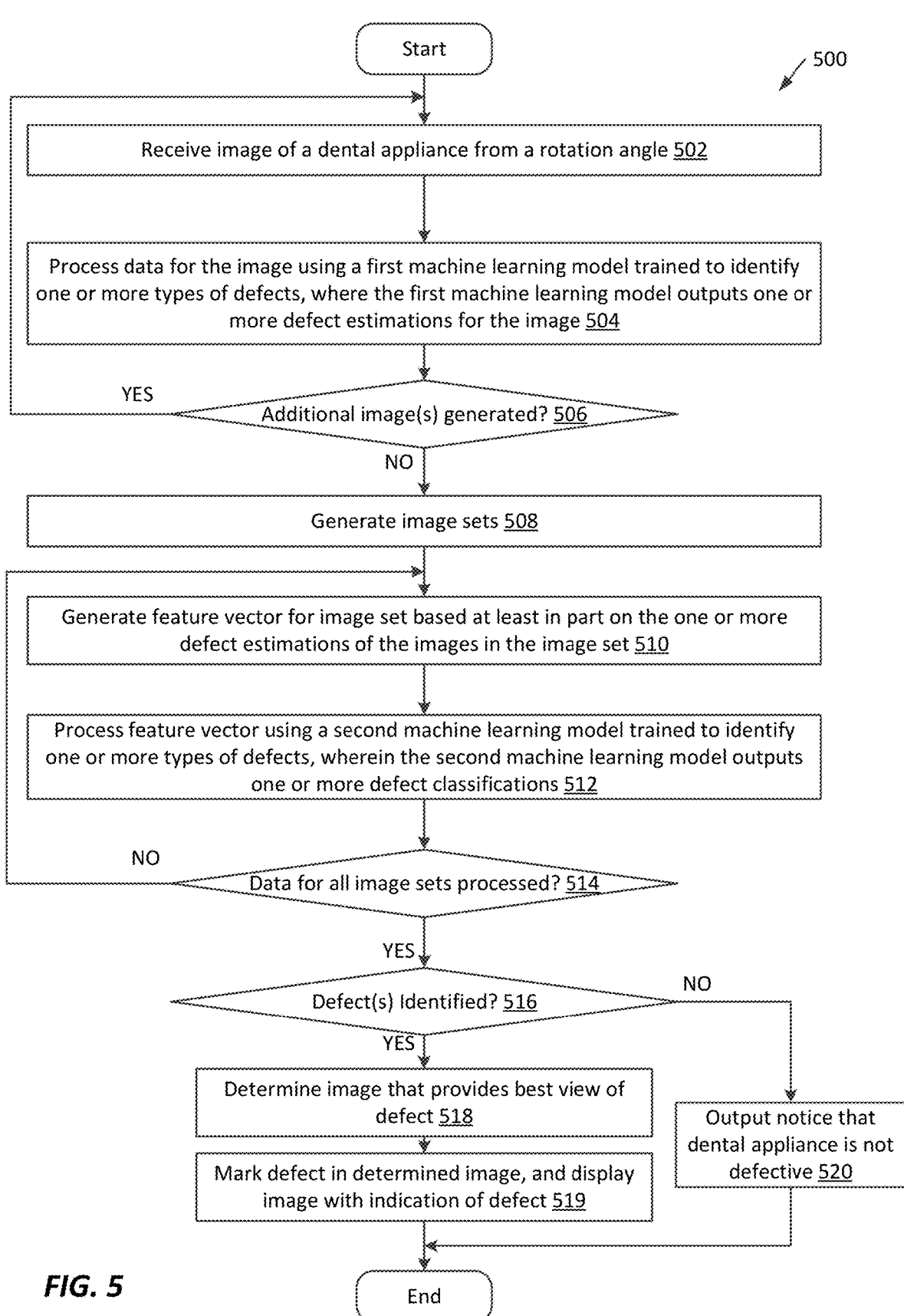
FIG. 5 illustrates a flow diagram for a method of detecting a defect in a dental appliance, in accordance with one embodiment.

FIG. 5 illustrates a flow diagram for a method 500 of detecting a defect in a dental appliance, in accordance with one embodiment. Some operations of method 500 may be performed by a processing logic that may comprise hardware (e.g., circuitry, dedicated logic, programmable logic, microcode, etc.), software (e.g., instructions run on a processing device to perform hardware simulation), or a combination thereof. The processing logic may execute on one or many processing devices (e.g., of computing device 135 of FIG. 1). The processing logic may be processing logic of image inspection module 145 and/or of imager control module 140 in embodiments. Some operations of the methods may be performed by a defect detection system.

For simplicity of explanation, the method 500 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

It should be noted that the method 500 may be performed for multiple unique orthodontic aligners. In one embodiment, the method 500 may be performed for each unique orthodontic aligner for each stage of a patient's orthodontic treatment plan. Each unique aligner may be customized for a stage of the treatment plan. The aligner may be a 3D printed aligner, or may have been formed by thermoforming a sheet of plastic over a 3D printed mold of a dental arch.

At block 502 of method 500, an image of a dental appliance generated from a rotation angle of a platform may be generated using one or more imaging devices (e.g., camera apparatus 116) based on instructions from processing logic. The image may then be received by processing logic. At block 504, processing logic processes data from the image using a first machine learning model (e.g., defect estimator 467) trained to identify one or more types of defects. The first machine learning model outputs one or more defect estimations for the image. The defect estimations may have the form of image feature vectors in one embodiment, as described above.

At block 506, processing logic determines whether additional images have been generated that have not yet been processed using the first machine learning model. If such additional images have been generated, the method returns to block 502, and operations 502 and 504 are repeated for the additional image. This cycle may repeat until all images have been processed by the first machine learning model. If there are no additional unprocessed images at block 506, the method continues to block 508.

At block 508, processing logic generates image sets. This may include first associating platform rotation angle information with each image defect estimation/feature vector. Two or more images (e.g., three images) that are neighboring images according to the platform rotation angle information may be grouped into an image data set. Multiple image sets may be generated, and data for the same image may be used in multiple image sets.

At block 510, processing logic generates a feature vector (e.g., final feature vector 470A-K) for an image set based at least in part on one or more defect estimations of the images in the image set. In one embodiment, the feature vector for each image set includes a first amount of information for a central image or image of interest, and a second lesser amount of information for one or more peripheral images (e.g., an image to a left and an image to a right of the central image or an image taken immediately before and an image taken immediately after the central image). In one embodiment, the data for the feature vector includes some or all of the data specified in the table of FIG. 10B.

At block 512, processing logic processes the feature vector for the image set using a second machine learning model (e.g., defect classifier 472) to identify one or more defects. The second machine learning model outputs one or more defect classifications. The defect classifications output by the second machine learning model may be or include a single classification for the image set in one embodiment, where the single classification indicates a confidence or probability that a defect was included in the image set. In some embodiments, a single machine learning model performs the operations of the above described first and second machine learning models. For example, one or more layers of the machine learning model may identify defects and one or more additional layers of the machine learning model may classify the identified defects. In some embodiments, some defect classifications are performed by a same machine learning model that detects defects, and some defect classifications are performed by a separate machine learning model.

At block 514, processing logic determines whether data for all of the image sets has been processed by the second machine learning model. If not, the method may return to block 510 for generation and/or processing of a new final feature vector of a next image set. If data for all image sets has been processed, the method proceeds to block 516.

At block 516, processing logic determines whether defects have been identified for any of the image sets. If the answer is no, the method continues to block 520 and a notice may be output that the dental appliance is not defective (does not contain any defects). If the answer is yes, the method may continue to block 518.

At block 518, processing logic determines an image that provides a best view of a defect having a highest probability or confidence value. Processing logic may make such a determination by comparing the confidence scores of each defect of each image output by the first machine learning model and/or the confidence scores of each defect of each image set output by the second machine learning model to identify an image associated with a defect estimation/classification having a highest confidence score.

At block 519, processing logic may mark the defect in the determined image based on the defect estimation (e.g., bounding box coordinates and/or size) output by the first machine learning model for the determined image. The marked image may then be displayed (e.g., output to a display of a GUI) for view by a user.

Figure 10A:
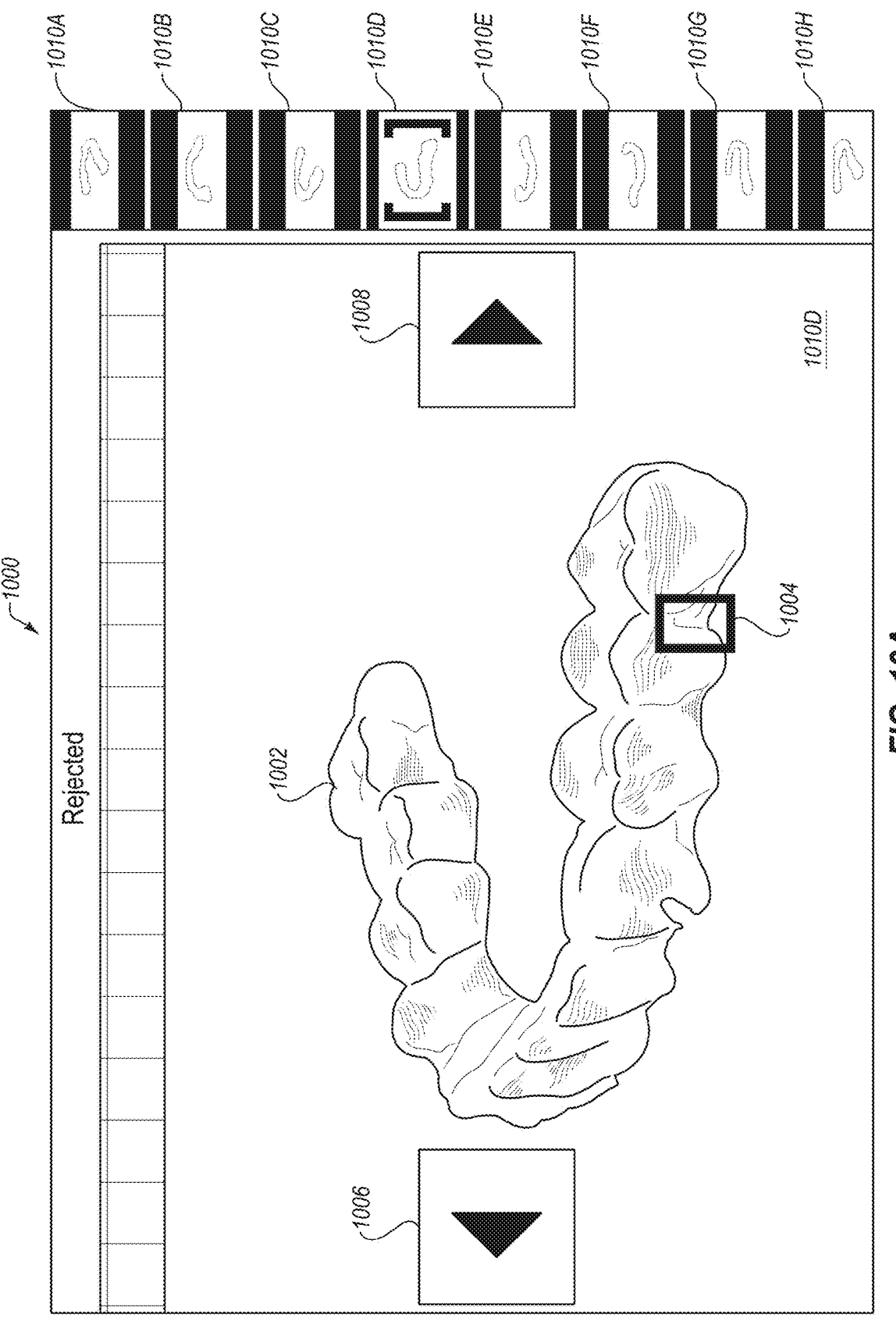
FIG. 10A illustrates an user interface of a defect detection system (e.g., of an image inspection module), in accordance with one embodiment.

FIG. 10A illustrates a user interface 1000 of a defect detection system (e.g., of an image inspection module), in accordance with one embodiment. The user interface 1000 includes a view 1010D of an image that provides a best view of a defect 1004 on an aligner 1002 that was rejected (e.g., for which a defect was detected). The user interface 1000 additionally includes input mechanisms 1006, 1008 (e.g., icons or virtual buttons) for scrolling to a next image and/or a previous image. Additionally, the user interface 1000 includes thumbnail views 1010A-H of some or all of the images generated of the aligner 1002. A user may click on or select any of the thumbnail views 1010A-H to cause the view of image 1010D to be replaced with a view of the selected image. If a defect was detected in the selected image, then a bounding box or shape around that defect may be shown in the view of the image.

Figure 6C:
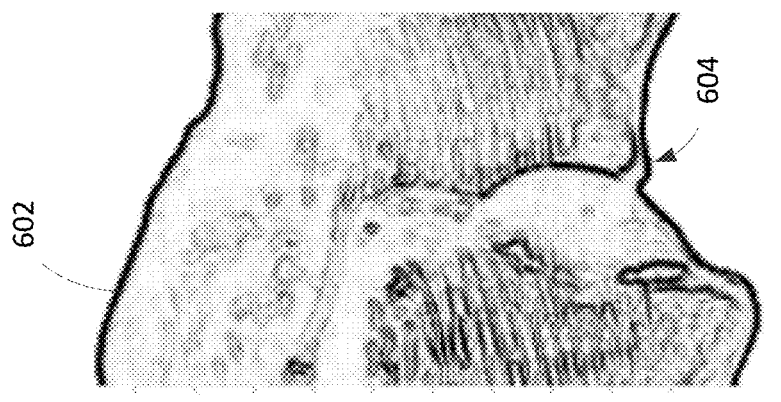
FIGS. 6A-C are images of a damaged dental appliance from three different viewpoints, in accordance with one embodiment.
Figure 6B:
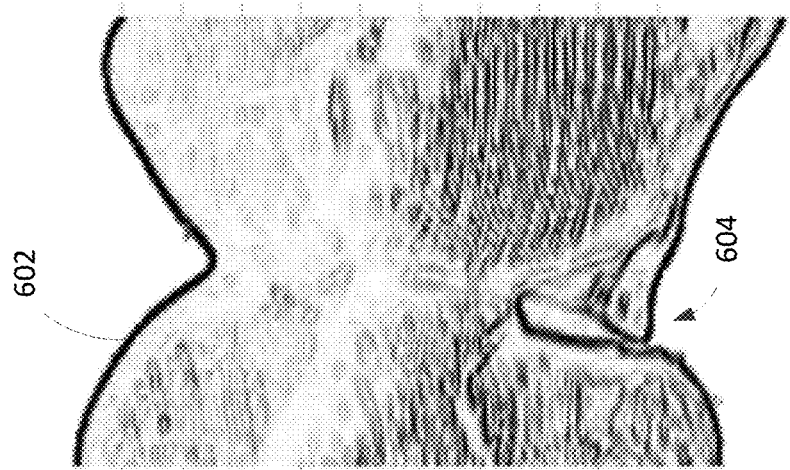
Figure 6A:
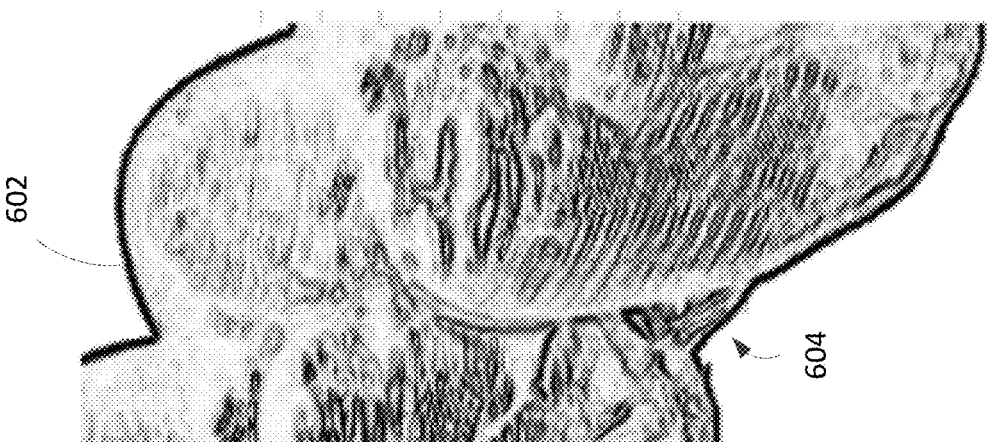

FIGS. 6A-C are images of a damaged dental appliance 602 from three different viewpoints, in accordance with one embodiment. FIG. 6A shows a first view of the damaged dental appliance 602 in which a confidence of a defect 604 may be low to medium. FIG. 6B shows a second view of the damaged dental appliance 602 in which a confidence of the defect 604 is high. FIG. 6C shows a third view of the damaged dental appliance 602 in which a confidence of the defect 604 is low. The defect 604 is a crack, rip or tear in the dental appliance 602.

Figures 6D, 6E, 6F:
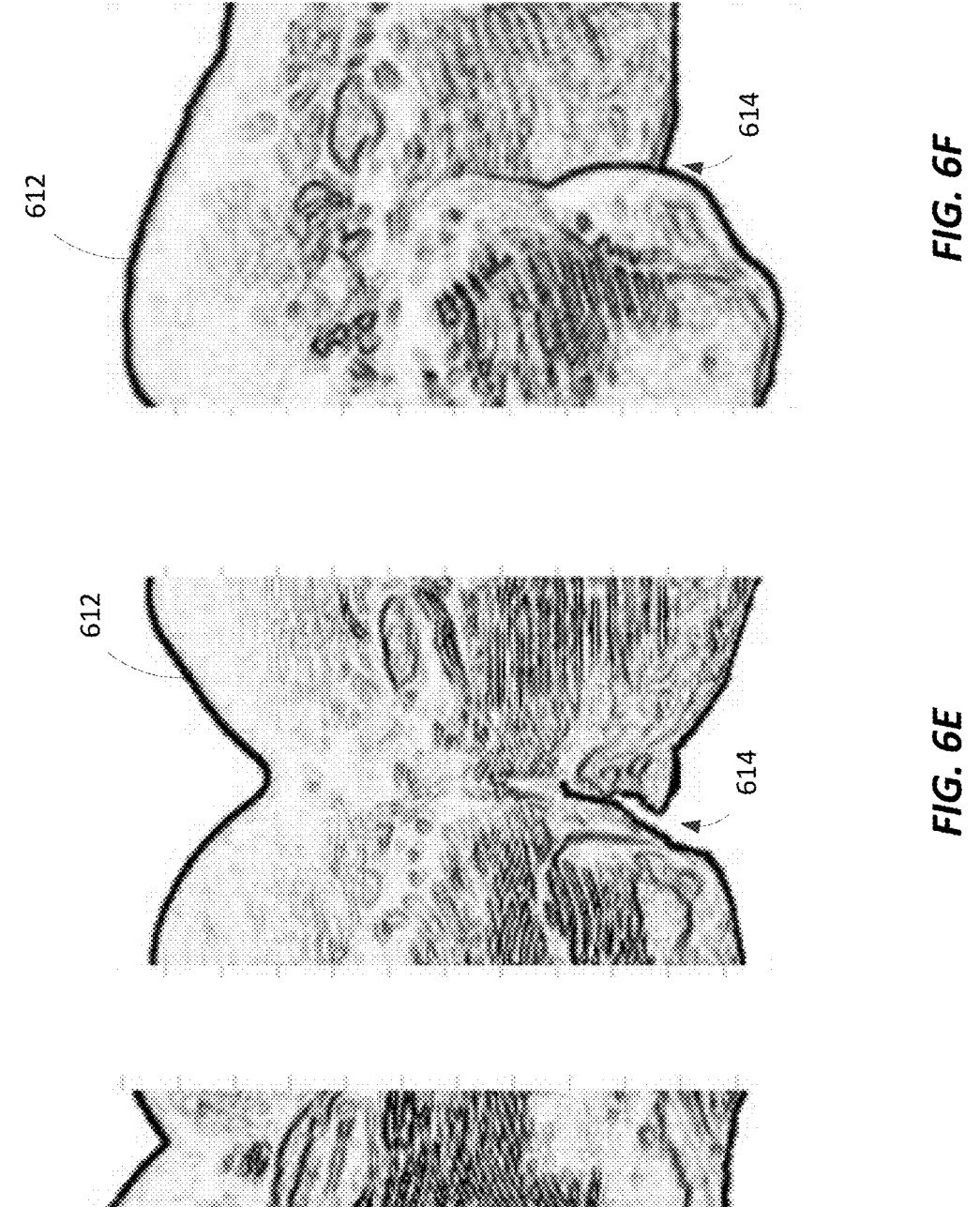
FIGS. 6D-F are images of a damaged dental appliance from three different viewpoints, in accordance with one embodiment.

FIGS. 6D-F are images of a damaged dental appliance 612 from three different viewpoints, in accordance with one embodiment. FIG. 6D shows a first view of the damaged dental appliance 612 in which a confidence of a defect 614 may be low. FIG. 6B shows a second view of the damaged dental appliance 612 in which a confidence of the defect 614 is high. FIG. 6C shows a third view of the damaged dental appliance 612 in which a confidence of the defect 614 is low. The defect 614 is a crack, rip or tear in the dental appliance 612. Cracks, rips, tears, and similar defects may be a first class of defect that may be detected in embodiments. Some dental appliances may include intentional precision cut features such as hooks, cutouts, etc. which may be difficult to distinguish from cracks, rips, etc.

Figures 7A, 7B:
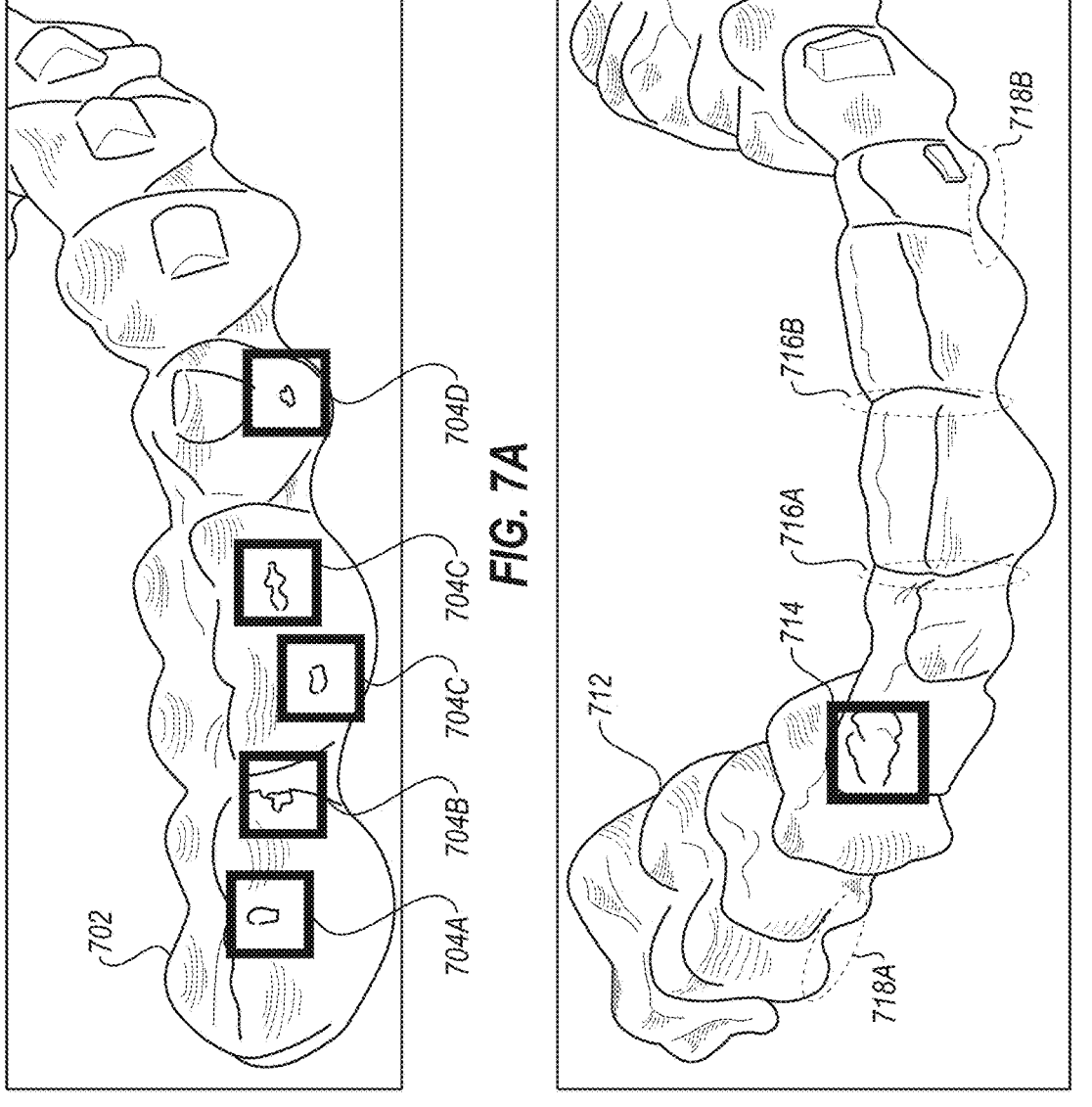
FIG. 7A is an image of a damaged dental appliance with multiple detected defects, in accordance with one embodiment.
FIG. 7B is an image of a damaged dental appliance with a single detected defect, in accordance with one embodiment.

FIG. 7A is an image of a damaged dental appliance 702 with multiple detected defects 704A-D, in accordance with one embodiment. The detected defects 704A-D are protrusions that may be caused by debris on an underlying mold during a thermoforming process. The detected defects 704A-D may be associated with a debris defect class. In some embodiments, the debris defect class can be difficult to differentiate from intentional protrusions in the dental appliance caused by protrusions on the mold used to form the dental appliance that correspond to attachments that will be placed on a patient's teeth. Shown in the image are interproximal regions 716A, 716B (e.g., regions of the dental appliance 702 between cavities of the dental appliance that are configured to receive adjoining teeth) and gingival regions 718A, 718B (e.g., regions of the dental appliance 702 that will interface with a patient's gingiva when worn).

FIG. 7B is an image of a damaged dental appliance 712 with a single detected defect 714, in accordance with one embodiment. The defect 714 may be an indentation or dent, which may be caused by a cavity in a mold used to form the dental appliance 712.

Figure 7C:
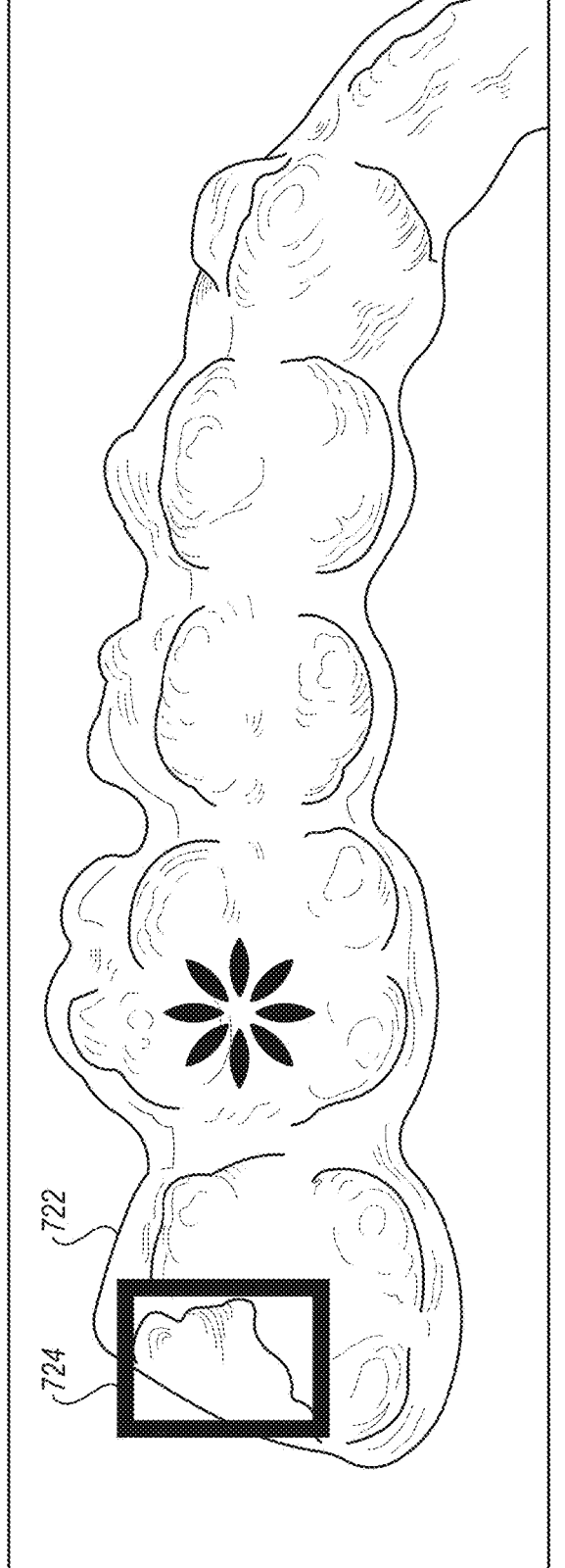
FIG. 7C is an image of a damaged dental appliance with a single detected defect, in accordance with one embodiment.

FIG. 7C is an image of a damaged dental appliance 722 with a single detected defect 724, in accordance with one embodiment. The defect 724 may be an indentation or dent, which may be caused by a cavity in a mold used to form the dental appliance 722.

Figure 7D:
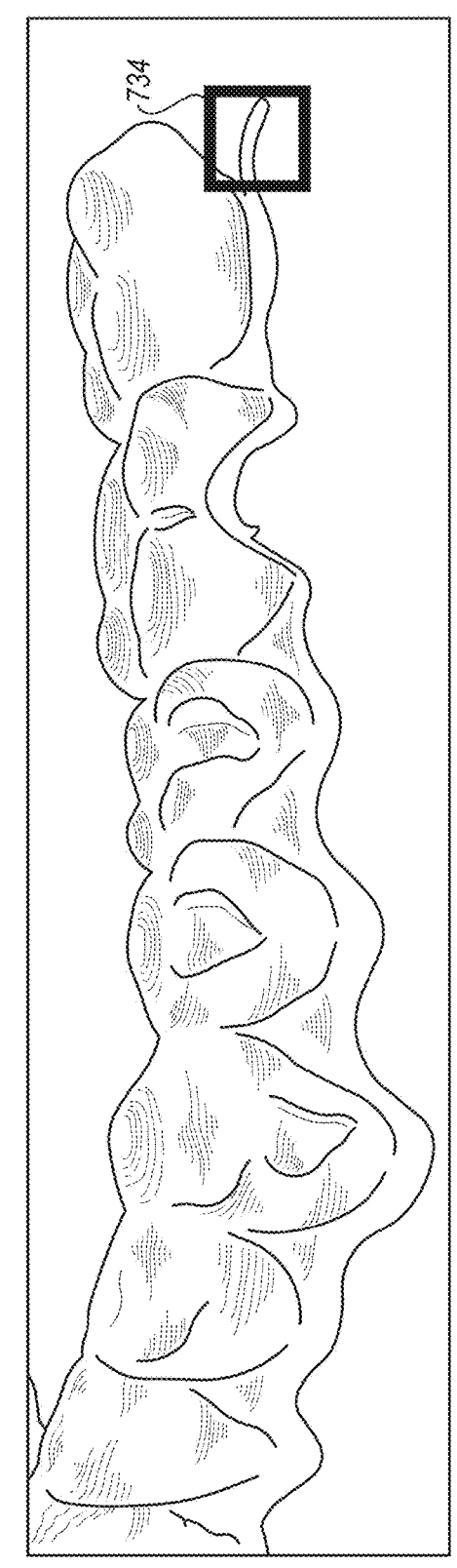
FIG. 7D is an image of a damaged dental appliance with a single detected defect, in accordance with one embodiment.

FIG. 7D is an image of a damaged dental appliance 732 with a single detected defect 734, in accordance with one embodiment. The defect 734 may be a rip or break (also referred to as a broken defect).

Figures 8A, 8B, 8C:
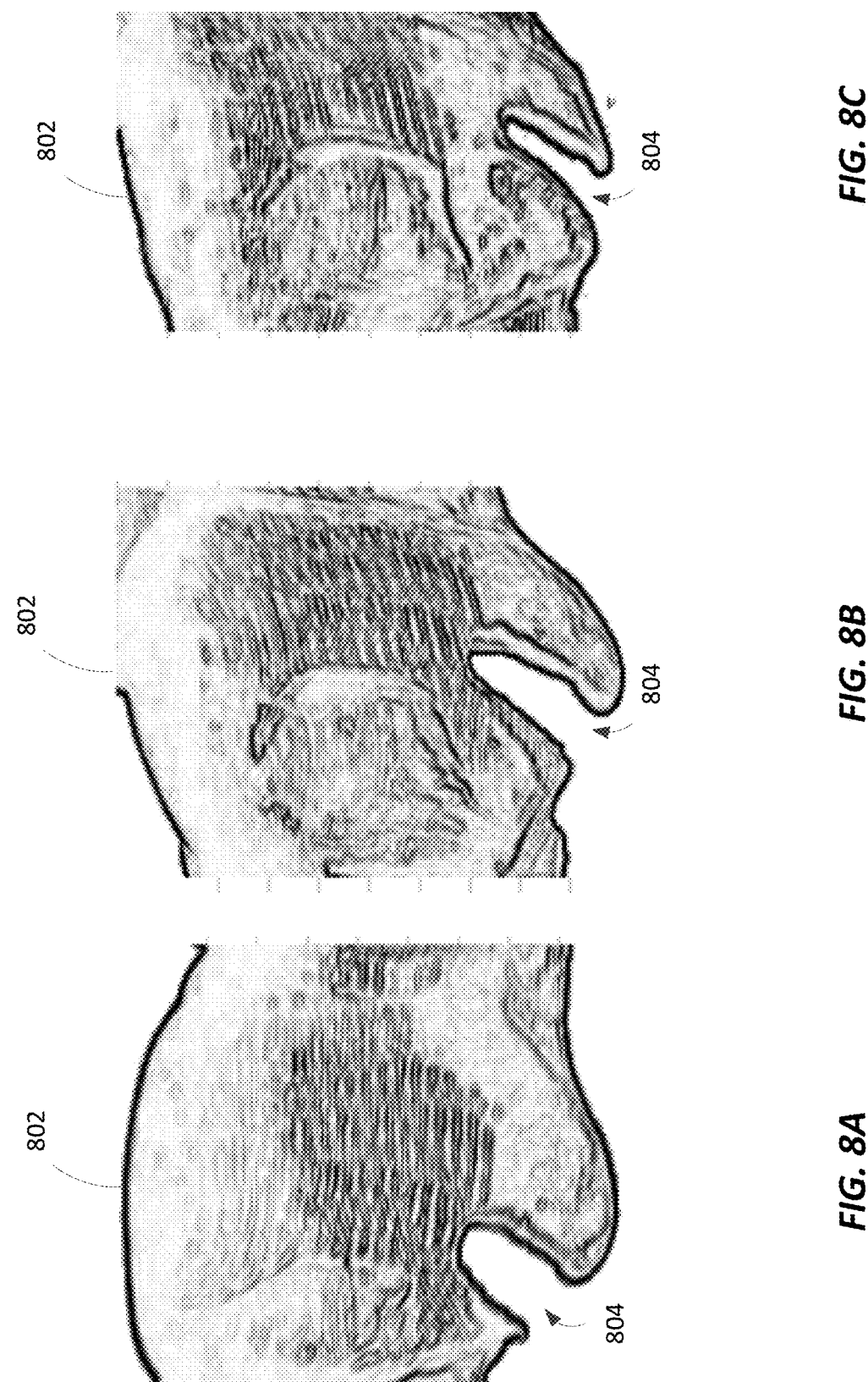
FIGS. 8A-C illustrate images of a first undamaged dental appliance that includes a feature easily confused with a defect from three different viewpoints, in accordance with one embodiment.

FIGS. 8A-C illustrate images of a first undamaged dental appliance 802 that includes a feature 804 easily confused with a defect from three different viewpoints, in accordance with one embodiment. The feature 804 is a hook that is cut into the dental appliance. The hook may be used, for example, to secure one end of an elastic band. The feature 804 may be detected as a defect in each of the images in some embodiments.

Figure 9C:
FIGS. 9A-C illustrate images of a second undamaged dental appliance that includes a feature easily confused with a defect from three different viewpoints, in accordance with one embodiment.
Figure 9B:
Figure 9A:

FIGS. 9A-C illustrate images of a second undamaged dental appliance 902 that includes a feature 904 easily confused with a defect from three different viewpoints, in accordance with one embodiment. The feature 904 is a hook that is cut into the dental appliance. The hook may be used, for example, to secure one end of an elastic band. The feature 904 may be detected as a defect in each of the images in some embodiments.

In general, true defects such as rips, tears, cracks, etc. as shown in FIGS. 6A-F may only have a high defect confidence score in one or a few images. In contrast, certain features that resemble rips, tears, cracks, etc. may be detected as defects with high confidence scores in multiple images. A trained machine learning model may take advantage of this fact to distinguish between true defects as shown in FIGS. 6A-F and falsely reported defects as shown in FIGS. 8A-9C using a second trained machine learning model that takes as an input data associated with multiple images of a dental appliance (e.g., a final feature vector that includes data from multiple input feature vectors, each of which may have been generated by a first trained machine learning model after processing a respective image of an image set).

Figure 11:
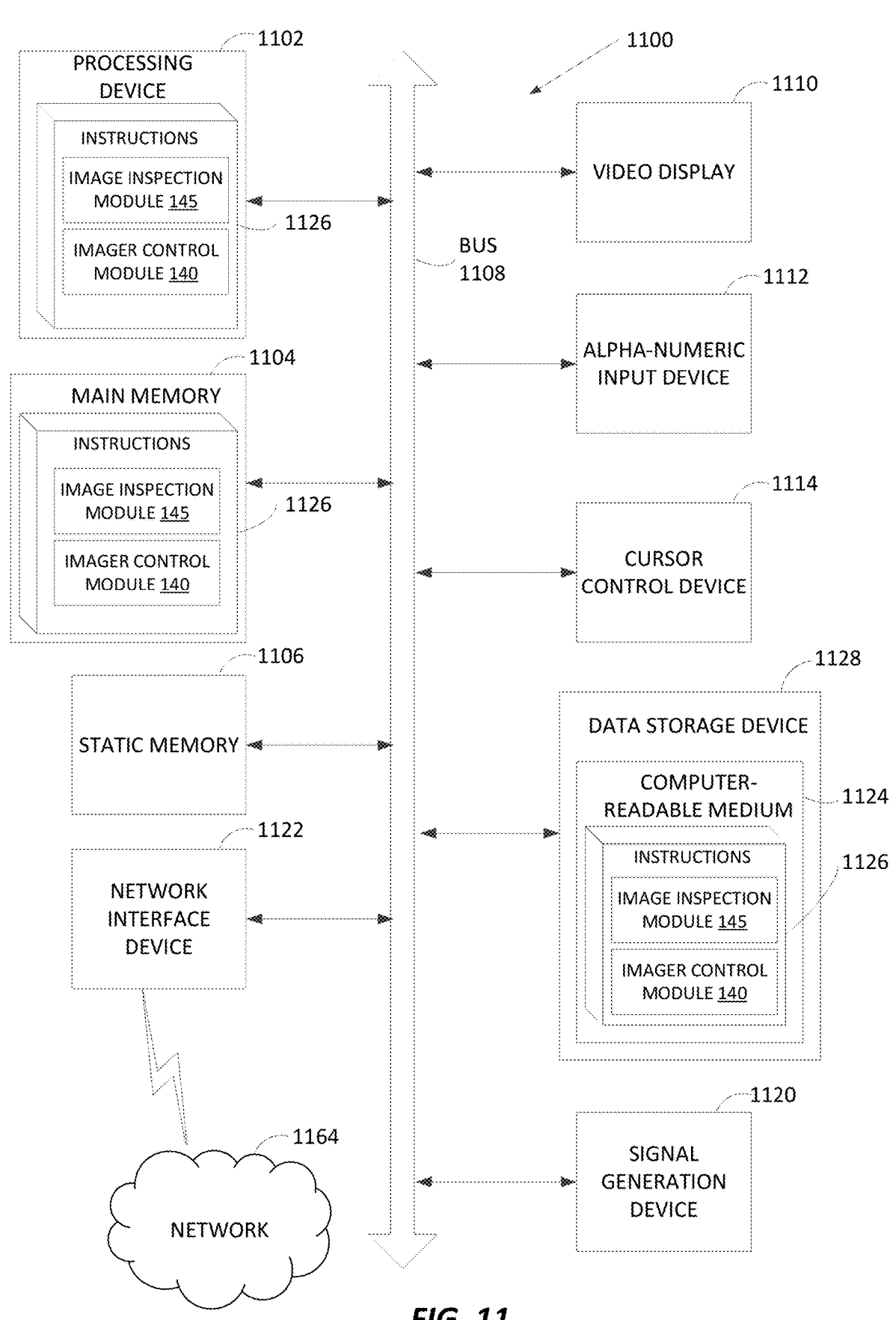
FIG. 11 illustrates a block diagram of an example computing device, in accordance with embodiments.

FIG. 11 illustrates a diagrammatic representation of a machine in the example form of a computing device 1100 within which a set of instructions, for causing the machine to perform any one or more of the methodologies discussed with reference to the earlier figures. In alternative embodiments, the machine may be connected (e.g., networked) to other machines in a Local Area Network (LAN), an intranet, an extranet, or the Internet. In one embodiment, the computing device 1100 corresponds to the computing device 135 of FIG. 1A. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1100 includes a processing device 1102, a main memory 1104 (e.g., read only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1128), which communicate with each other via a bus 1108.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute the processing logic (instructions 1126) for performing operations and steps discussed herein.

The computing device 1100 may further include a network interface device 1122 for communicating with a network 1164. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1128 may include a machine-readable storage medium (or more specifically a non-transitory computer-readable storage medium) 1124 on which is stored one or more sets of instructions 1126 embodying any one or more of the methodologies or functions described herein. A non-transitory storage medium refers to a storage medium other than a carrier wave. The instructions 1126 may also reside, completely or at least partially, within the main memory 1104 and/or within the processing device 1102 during execution thereof by the computer device 1100, the main memory 1104 and the processing device 1102 also constituting computer-readable storage media.

The computer-readable storage medium 1124 may also be used to store an image inspection module 145 and/or imager control module 140 as described herein above, which may perform one or more of the operations of methods described above. The computer readable storage medium 1124 may also store a software library containing methods that call an image inspection module 145 and/or imager control module 140. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, and other non-transitory computer-readable media.

As discussed herein above, in some embodiments, the defect detection systems of FIG. 1 and method 500 of FIG. 5 may be used to perform automated defect detection of dental appliances. FIG. 12A illustrates one type of dental appliance which is an exemplary tooth repositioning appliance or aligner 1200 that can be worn by a patient in order to achieve an incremental repositioning of individual teeth 1202 in the jaw. The appliance can include a shell (e.g., a continuous polymeric shell or a segmented shell) having teeth-receiving cavities that receive and resiliently reposition the teeth. An aligner (also referred to as an appliance) or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal or greater than 3 repeating units, optionally, in some embodiments equal to or greater than 10 repeating units, in some embodiments greater or equal to 30 repeating units) and a high molecular weight (e.g., greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, polypropylenes, polyethylenes, polyethylene terephthalates, poly lactic acid, polyurethanes, epoxide polymers, polyethers, poly(vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not inclusive, but rather is exemplary. The plastics can be thermosets or thermoplastics. The plastic may be thermoplastic.

Examples of materials applicable to the embodiments disclosed herein include, but are not limited to, those materials described in the following Provisional patent applications filed by Align Technology: "MULTIMATERIAL ALIGNERS," U.S. Prov. App. Ser. No. 62/189,259, filed Jul. 7, 2015; "DIRECT FABRICATION OF ALIGNERS WITH INTERPROXIMAL FORCE COUPLING", U.S. Prov. App. Ser. No. 62/189,263, filed Jul. 7, 2015; "DIRECT FABRICATION OF ORTHODONTIC APPLIANCES WITH VARIABLE PROPERTIES," U.S. Prov. App. Ser. No. 62/189,291, filed Jul. 7, 2015; "DIRECT FABRICATION OF ALIGNERS FOR ARCH EXPANSION", U.S. Prov. App. Ser. No. 62/189,271, filed Jul. 7, 2015; "DIRECT FABRICATION OF ATTACHMENT TEMPLATES WITH ADHESIVE," U.S. Prov. App. Ser. No. 62/189,282, filed Jul. 7, 2015; "DIRECT FABRICATION CROSS-LINKING FOR PALATE EXPANSION AND OTHER APPLICATIONS", U.S. Prov. App. Ser. No. 62/189,301, filed Jul. 7, 2015; "SYSTEMS, APPARATUSES AND METHODS FOR DENTAL APPLIANCES WITH INTEGRALLY FORMED FEATURES", U.S. Prov. App. Ser. No. 62/189,312, filed Jul. 7, 2015; "DIRECT FABRICATION OF POWER ARMS", U.S. Prov. App. Ser. No. 62/189,317, filed Jul. 7, 2015; "SYSTEMS, APPARATUSES AND METHODS FOR DRUG DELIVERY FROM DENTAL APPLIANCES WITH INTEGRALLY FORMED RESERVOIRS", U.S. Prov. App. Ser. No. 62/189,303, filed Jul. 7, 2015; "DENTAL APPLIANCE HAVING ORNAMENTAL DESIGN", U.S. Prov. App. Ser. No. 62/189,318, filed Jul. 7, 2015; "DENTAL MATERIALS USING THERMOSET POLYMERS," U.S. Prov. App. Ser. No. 62/189,380, filed Jul. 7, 2015; "CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM," U.S. Prov. App. Ser. No. 62/667,354, filed May 4, 2018; "POLYMERIZABLE MONOMERS AND METHOD OF POLYMERIZING THE SAME," U.S. Prov. App. Ser. No. 62/667,364, filed May 4, 2018; and any conversion applications thereof (including publications and issued patents), including any divisional, continuation, or continuation-in-part thereof.

The appliance 1200 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved an also serve as a base or anchor for holding the appliance in place over the teeth. In some cases, however, it may be desirable or necessary to provide individual attachments or other anchoring elements 1204 on teeth 1202 with corresponding receptacles or apertures 1206 in the appliance 1200 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830, 450.

Figure 12B:
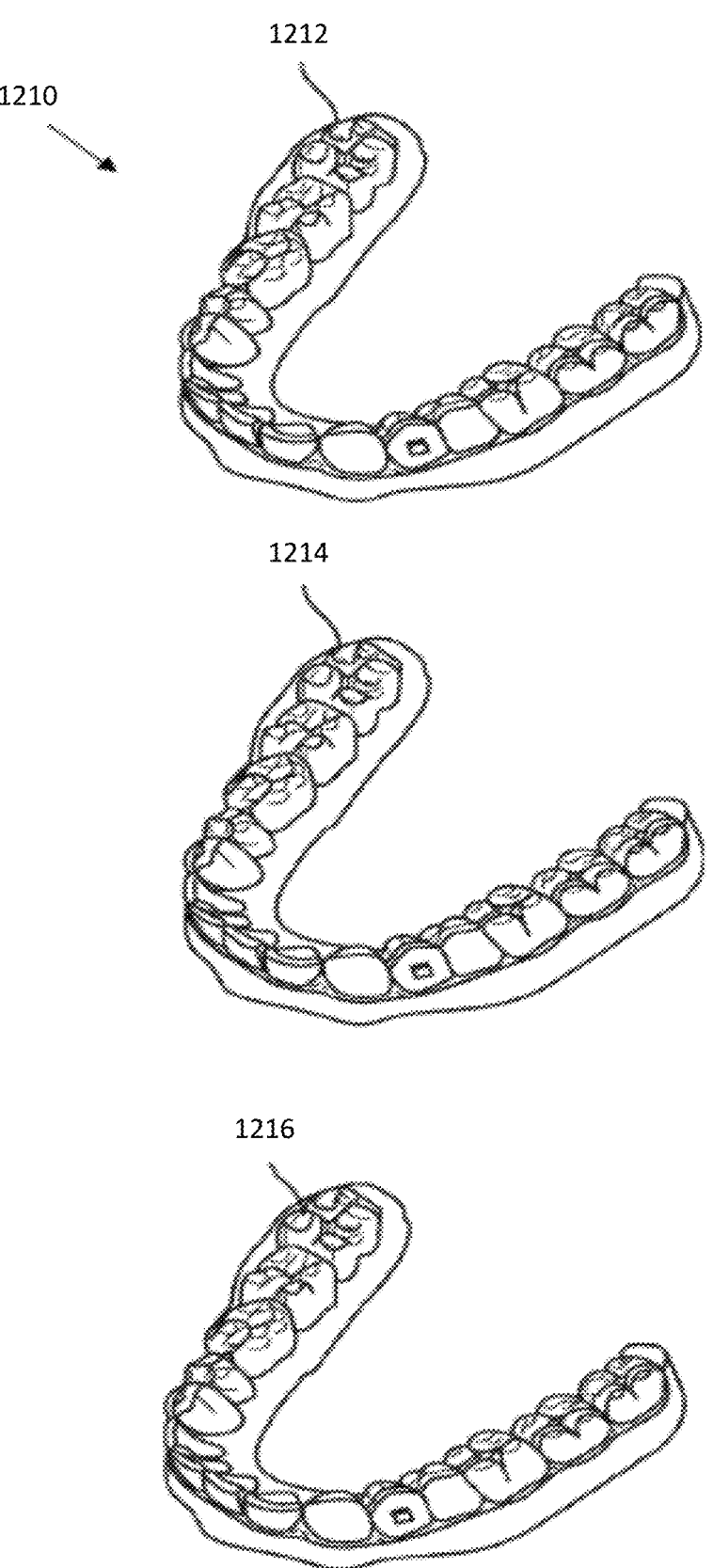
FIG. 12B illustrates a tooth repositioning system, in accordance with embodiments.

FIG. 12B illustrates a tooth repositioning system 1210 including a plurality of appliances 1212, 1214, and 1216. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1210 can include a first appliance 1212 corresponding to an initial tooth arrangement, one or more intermediate appliances 1214 corresponding to one or more intermediate arrangements, and a final appliance 1216 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 1212, 1214, 1216, or portions thereof, can be produced using indirect fabrication techniques, such as thermoforming over a positive or negative mold, which may be inspected using the methods and systems described herein above. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be formed by a rapid prototyping machine (e.g., a SLA 3D printer). The rapid prototyping machine may receive digital models of molds of dental arches and/or digital models of the appliances 1212, 1214, 1216 after the digital models of the appliances 1212, 1214, 1216 have been processed by processing logic of a computing device. The processing logic may include hardware (e.g., circuitry, dedicated logic, programming logic, microcode, etc.), software (e.g., instructions executed by a processing device), firmware, or a combination thereof.

To manufacture the molds, a shape of a dental arch for a patient at a treatment stage is determined based on a treatment plan. In the example of orthodontics, the treatment plan may be generated based on an intraoral scan of a dental arch to be molded. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting technologies (e.g., to design the virtual 3D mold). Alternatively, an initial negative mold may be generated from an actual to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model will be different. The original virtual 3D model, the final virtual model 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specific geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances SLA is used to fabricate an SLA mold. In SLA, the mold is fabricated by successively printing thin layers of a photo-curable material (e.g., a polymeric resin) on top of one another. A platform rests in a bath of liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as polyester, a co-polyester, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a poly-trimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

After the mold is generated, it may be inspected using the systems and/or methods described herein above. If the mold passes the inspection, then it may be used to form an appliance (e.g., an aligner).

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 1212, 1214, and 1216 can be pressure formed or thermoformed over the molds. Each mold may be used to fabricate an appliance that will apply forces to the patient's teeth at a particular stage of the orthodontic treatment. The appliances 1212, 1214, and 1216 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell.

Additional information may be added to the appliance. The additional information may be any information that pertains to the aligner. Examples of such additional information includes a part number identifier, patient name, a patient identifier, a case number, a sequence identifier (e.g., indicating which aligner a particular liner is in a treatment sequence), a date of manufacture, a clinician name, a logo and so forth. For example, after an appliance is thermoformed, the aligner may be laser marked with a part number identifier (e.g., serial number, barcode, or the like). In some embodiments, the system may be configured to read (e.g., optically, magnetically, or the like) an identifier (barcode, serial number, electronic tag or the like) of the mold to determine the part number associated with the aligner formed thereon. After determining the part number identifier, the system may then tag the aligner with the unique part number identifier. The part number identifier may be computer readable and may associate that aligner to a specific patient, to a specific stage in the treatment sequence, whether it is an upper or lower shell, a digital model representing the mold the aligner was manufactured from and/or a digital file including a virtually generated digital model or approximated properties thereof of that aligner (e.g., produced by approximating the outer surface of the aligner based on manipulating the digital model of the mold, inflating or scaling projections of the mold in different planes, etc.).

After an appliance is formed over a mold for a treatment stage, that appliance is subsequently trimmed along a cutline (also referred to as a trim line) and the appliance may be removed from the mold. The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances 1212, 1214, and 1216. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances 1212, 1214, and 1216 can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances 1212, 1214, and 1216 can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances 1212, 1214, and 1216. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances 1212, 1214, and 1216 are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, and then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Once appliances (e.g., aligners) are directly fabricated, they may be inspected using the systems and/or methods described herein above.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

FIG. 13 illustrates a method 1300 of orthodontic treatment using a plurality of appliances, in accordance with embodiments. The method 1300 can be practiced using any of the appliances or appliance sets described herein. In block 1302, a first orthodontic appliance is applied to a patient's teeth in order to reposition the teeth from a first tooth arrangement to a second tooth arrangement. In block 1304, a second orthodontic appliance is applied to the patient's teeth in order to reposition the teeth from the second tooth arrangement to a third tooth arrangement. The method 1300 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 14 illustrates a method 1400 for designing an orthodontic appliance to be produced by direct fabrication, in accordance with embodiments. The method 1400 can be applied to any embodiment of the orthodontic appliances described herein. Some or all of the blocks of the method 1400 can be performed by any suitable data processing system or device, e.g., one or more processors configured with suitable instructions.

In block 1402, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1404, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 1406, an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1408, instructions for fabrication of the orthodontic appliance incorporating the orthodontic appliance are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 1400 may comprise additional blocks: 1) The upper arch and palate of the patient is scanned intraorally to generate three dimensional data of the palate and upper arch; 2) The three dimensional shape profile of the appliance is determined to provide a gap and teeth engagement structures as described herein.

Although the above blocks show a method 1400 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 1400 may be performed with any suitable fabrication system or device, such as the embodiments described herein. Some of the blocks may be optional, and the order of the blocks can be varied as desired.

Figure 15:
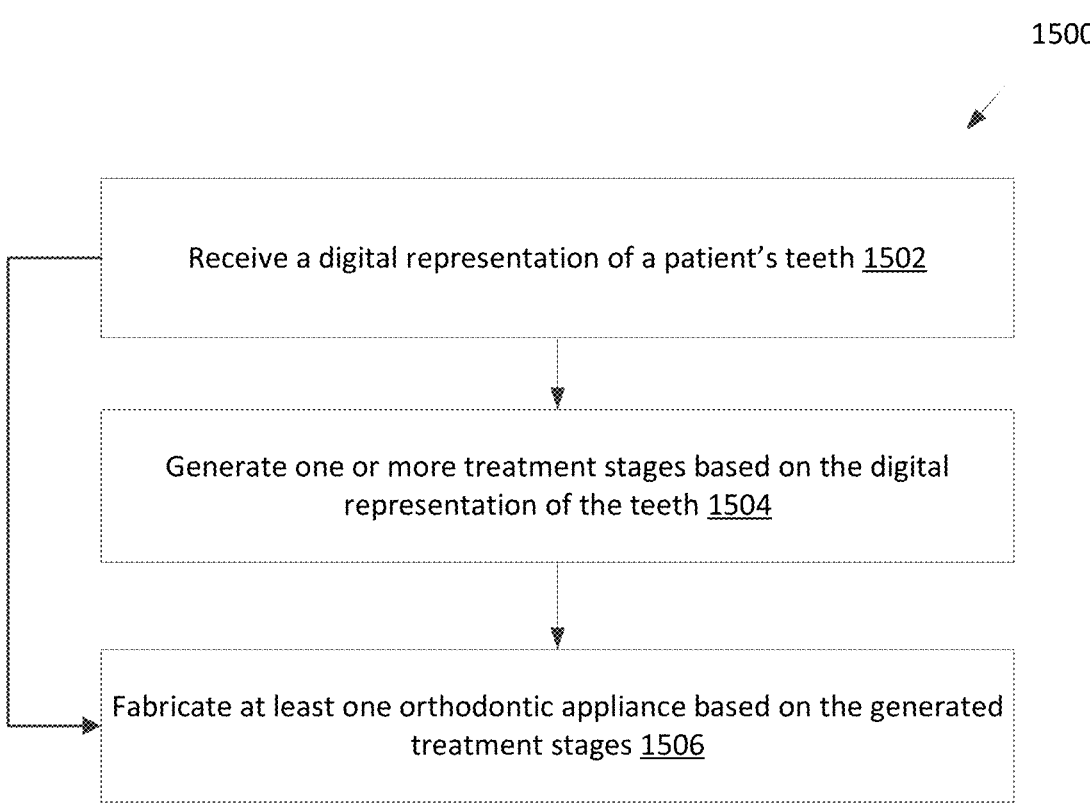
FIG. 15 illustrates a method for digitally planning an orthodontic treatment, in accordance with embodiments.

FIG. 15 illustrates a method 1500 for digitally planning an orthodontic treatment and/or design or fabrication of an appliance, in accordance with embodiments. The method 1500 can be applied to any of the treatment procedures described herein and can be performed by any suitable data processing system.

In block 1510, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1502, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1504, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. Design and/or fabrication of an orthodontic appliance, and perhaps a particular orthodontic treatment, may include use of a representation of the patient's teeth (e.g., receive a digital representation of the patient's teeth), followed by design and/or fabrication of an orthodontic appliance based on a representation of the patient's teeth in the arrangement represented by the received representation.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A defect detection system of dental appliances, comprising:

a platform to support a dental appliance;

a camera to generate a plurality of images of the dental appliance at a plurality of position settings about the platform, wherein each image of the plurality of images depicts a distinct region of the dental appliance;

a light source to illuminate the dental appliance during generation of the plurality of images; and a computing device to:

process the plurality of images to determine, for each image of the plurality of images, one or more defect estimations;

generate one or more sets of defect estimations, wherein each set of the one or more sets comprises the one or more defect estimations associated with a subset of the plurality of images;

generate, for each set of defect estimations of the one or more sets of defect estimations, a feature vector usable to determine whether the set of defect estimations amounts to one or more defect classifications, wherein the feature vector comprises at least a)

defect coordinates for a first defect of a first image of the subset of the plurality of images and b) numbers of defects of one or more additional images of the subset of the plurality of images that are neighboring images to the first image;

process the feature vector for each of the one or more sets of defect estimations to determine the one or more defect classifications; and determine whether the dental appliance has a defect based on the one or more defect classifications associated with the one or more sets of defect estimations.

2. The defect detection system of claim 1, wherein processing of the plurality of images to determine, for each image of the plurality of images, the one or more defect estimations comprises processing the plurality of images using a first machine learning model trained to identify one or more types of defects, wherein for each image of the plurality of images the first machine learning model outputs the one or more defect estimations.

3. The defect detection system of claim 2, wherein processing the feature vector for each of the one or more sets of defect estimations comprises processing the feature vector using at least one of the first machine learning model or a second machine learning model that outputs the one or more defect classifications.

4. The defect detection system of claim 3, wherein the feature vector further comprises at least one of number of defects, defect size, or defect confidence.

5. The defect detection system of claim 1, wherein the computing device is further to:

for each image of the plurality of images, determine a distance between a nearest point on the dental appliance and the camera that generated the image, wherein the feature vector further comprises the determined distance for each image associated with the feature vector.

6. The defect detection system of claim 1, wherein the feature vector associated with the subset of the plurality of images comprises:

the defect coordinates, defect size, and a first defect confidence for the first defect of the first image;

a first number of defects, of a second image of the subset of the plurality of images that is a neighboring image to the first image, and a second defect confidence for the first number of defects; and a second number of defects, of a third image of the subset of the plurality of images that is a neighboring image to the first image, and a third defect confidence for the second number of defects.

7. The defect detection system of claim 3, wherein the first machine learning model comprises a convolutional neural network, and wherein the second machine learning model comprises a support vector machine.

8. The defect detection system of claim 1, wherein the computing device is further to:

responsive to determining that the dental appliance has a defect, output a notice that the dental appliance is a defective orthodontic appliance.

9. The defect detection system of claim 1, wherein each defect estimation of the one or more defect estimations comprises at least one of a defect size, a defect location, or a confidence score for the defect estimation.

10. The defect detection system of claim 1, wherein each set of defect estimations comprises the one or more defect estimations associated with at least three neighboring images.

11. The defect detection system of claim 1, wherein the one or more defect classifications comprise at least one of a break in the dental appliance, debris on the dental appliance, or an indent in the dental appliance.

12. The defect detection system of claim 1, wherein the plurality of images are generated from viewpoints evenly distributed about the platform.

13. The defect detection system of claim 1, wherein the platform is a rotatable platform, and wherein the plurality of position settings comprise a plurality of rotation settings of the rotatable platform.

14. The defect detection system of claim 1, wherein the platform is a transparent platform, and wherein the light source is disposed beneath the transparent platform.

15. The defect detection system of claim 1, wherein the plurality of images are generated from viewpoints that are at approximately 30-degree intervals of rotation about the dental appliance.

16. The defect detection system of claim 1, wherein the plurality of images are generated at a plurality of viewpoints that collectively are sufficient to capture a complete picture of defects on the dental appliance.

17. The defect detection system of claim 16, wherein the plurality of viewpoints capture interproximal regions of the dental appliance.

18. The defect detection system of claim 16, wherein the plurality of viewpoints capture gingival regions of the dental appliance.

19. The defect detection system of claim 16, wherein the plurality of viewpoints capture one or more areas of the dental appliance that are prone to damage from removal of the dental appliance from a mold or dentition.

20. A computer readable medium comprising instructions that, when executed by a processing device, cause the processing device to perform automated defect detection of a dental appliance based on operations comprising:

receiving a plurality of images of a dental appliance, wherein each of the plurality of images was generated from a different viewpoint of the dental appliance;

processing the plurality of images to determine, for each image of the plurality of images, one or more defect estimations;

generating one or more sets of defect estimations, wherein each set of the one or more sets comprises the one or more defect estimations associated with a subset of the plurality of images;

generating, for each set of defect estimations of the one or more sets of defect estimations, a feature vector usable to determine whether the set of defect estimations amounts to one or more defect classifications, wherein the feature vector comprises at least a) defect coordinates for a first defect of a first image of the subset of the plurality of images and b) numbers of defects of one or more additional images of the subset of the plurality of images that are neighboring images to the first image;

processing the feature vector for each of the one or more sets of defect estimations to determine the one or more defect classifications; and determining whether the dental appliance has a defect based on the one or more defect classifications associated with the one or more sets of defect estimations.

21. A method of performing automated defect detection of a dental appliance, comprising:

generating a plurality of images of a dental appliance using a camera, wherein each of the plurality of images is generated from a different viewpoint of the dental appliance;

processing the plurality of images by a processing device to determine, for each image of the plurality of images, one or more defect estimations;

generating one or more sets of defect estimations, wherein each set of the one or more sets comprises the one or more defect estimations associated with a subset of the plurality of images;

generating, for each set of defect estimations of the one or more sets of defect estimations, a feature vector usable to determine whether the set of defect estimations amounts to one or more defect classifications, wherein the feature vector comprises at least a) defect coordinates for a first defect of a first image of the subset of the plurality of images and b) numbers of defects of one or more additional images of the subset of the plurality of images that are neighboring images to the first image;

processing the feature vector for each of the one or more sets of defect estimations to determine the one or more defect classifications; and determining whether the dental appliance has a defect based on the one or more defect classifications associated with the one or more sets of defect estimations.

* * * * *